US012691781B2

(12) United States Patent　　　　(10) Patent No.:　US 12,691,781 B2

Siu et al.　　　　　　　　　　　　　　(45) Date of Patent:　　Jul. 28, 2026

(54) BIDIRECTIONAL VEHICLE TO LOAD CHARGING COMMUNICATION

(71) Applicant: Rivian IP Holdings, LLC, Irvine, CA (US)

(72) Inventors: Wendy Siu, Torrance, CA (US); Tyler Jennings Bennett, Long Beach, CA (US); Kush Upreti, Irvine, CA (US); Sarah Hipel, Detroit, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 520 days.

(21) Appl. No.: 18/326,175

(22) Filed: May 31, 2023

(65) Prior Publication Data

US 2024/0083288 A1　　Mar. 14, 2024

Related U.S. Application Data

(63) Continuation of application No. 17/931,183, filed on Sep. 12, 2022, now Pat. No. 11,701,983.

(51) Int. Cl.
*H02J 7/00*　　　　(2026.01)
*B60L 53/18*　　　　(2019.01)
　　　　(Continued)

(52) U.S. Cl.
CPC .............. *B60L 53/66* (2019.02); *B60L 53/18* (2019.02); *B60L 53/305* (2019.02); *B60L 53/65* (2019.02);
　　　　(Continued)

(58) Field of Classification Search
CPC ........ B60L 53/66; B60L 53/18; B60L 53/305; B60L 53/65; B60L 55/00; H02J 7/00032; H02J 7/00714; H02J 3/322
　　　　(Continued)

(56) References Cited

U.S. PATENT DOCUMENTS 10,065,519 B1　　9/2018　Appelbaum
2014/0184158 A1　　7/2014　Osawa et al.
　　　　(Continued)

OTHER PUBLICATIONS

Non-Final Office Action on U.S. Appl. No. 17/931,183 DTD Nov. 10, 2022.
　　　　(Continued)

*Primary Examiner* — Zixuan Zhou
(74) *Attorney, Agent, or Firm* — Foley & Lardner LLP

(57)　　　　　ABSTRACT

The present solution can execute a handshake process to establish a bidirectional session utilizing communications that can be implemented on EVs and chargers from various manufacturers. The present solution relates to a charger that can execute a handshake process communication between the charger and an electric vehicle to establish a session for bidirectional power delivery between the charger and the electric vehicle via a power cable. The charger can transmit, in the handshake process to the electric vehicle, a data structure comprising a field for a minimum current with a value for the field that is less than zero. The charger can configure, subsequent to transmission of the data structure comprising the value for the minimum current, the session for bidirectional power delivery between the charger and the electric vehicle via the power cable.

21 Claims, 10 Drawing Sheets

(51) Int. Cl.

| | |
|---|---|
| *B60L 53/30* | (2019.01) |
| *B60L 53/65* | (2019.01) |
| *B60L 53/66* | (2019.01) |
| *B60L 55/00* | (2019.01) |
| *H02J 3/32* | (2006.01) |
| *H02J 7/40* | (2026.01) |
| *H02J 7/94* | (2026.01) |

(52) U.S. Cl.
CPC .............. *B60L 55/00* (2019.02); *H02J 3/322* (2020.01); *H02J 7/40* (2026.01); *H02J 7/94* (2026.01)

(58) Field of Classification Search
USPC ............................................ 701/22; 320/109
See application file for complete search history.

(56) References Cited

U.S. PATENT DOCUMENTS

| | | |
|---|---|---|
| 2020/0231057 A1 | 7/2020 | Hishida et al. |
| 2023/0182601 A1* | 6/2023 | Kothari .................. B60L 53/14 320/109 |

OTHER PUBLICATIONS

Notice of Allowance on U.S. Appl. No. 17/931,183 DTD Mar. 2, 2023.

* cited by examiner

600

BIDIRECTIONAL VEHICLE TO LOAD CHARGING COMMUNICATION

CROSS-REFERENCES TO RELATED APPLICATIONS

This application claims the benefit of priority under 35 U.S.C. § 120 as a continuation of U.S. patent application Ser. No. 17/931,183, filed Sep. 12, 2022, which is hereby incorporated by reference herein in its entirety.

INTRODUCTION

Electric vehicles (EVs) can be powered using batteries that store energy. The EV batteries can be charged at charging stations.

SUMMARY

The present disclosure is generally directed to establishing a bidirectional charging session between an EV and a charging station. As EVs and charging stations, also referred to as chargers, can vary in their design and methods of communication, it can be a challenge to establish charging sessions between any different EVs and chargers. As a result, an EV utilizing one communication protocol could have difficulty using a charger that utilizes a different communication protocol. To address at least this technical challenge, this technical solution can provide a data communication (e.g., handshake) process to establish a charging session configured with functionality through which power can be conveyed reliably and without unnecessary computing resource or network resource utilization. The present solution can execute a handshake process to establish a bidirectional session utilizing communications that can be implemented on EVs and chargers from various manufacturers. For example, the present solution can include an EV charger that can transmit, to an EV, during a handshake process, a data structure that can include a field having a value that can be less than zero to indicate that the EV is capable of transferring power to the EV charger or is to be discharged. The value of the field can be greater than zero to indicate that the EV is to be charged. The charger and the EV can, based on the handshake, establish a session for bidirectional power delivery between the charger and the EV.

At least one aspect is directed to a system. The system can include a memory and one or more processors. The one or more processors can execute a communication between a charger and an electric vehicle to establish a session, via a power cable. The session can be for bidirectional power delivery between the charger and the electric vehicle. The one or more processors can transmit, in the communication to the electric vehicle, a data structure. The data structure can include a field for a minimum current with a value for the field that is less than zero. The one or more processors can configure, subsequent to transmission of the data structure comprising the value for the minimum current, the session for bidirectional power delivery between the charger and the electric vehicle, via the power cable.

At least one aspect is directed to a method. The method can include executing, by a memory and one or more processors, a communication between a charger and an electric vehicle, via a power cable. The communication can be to establish a session for bidirectional power delivery between the charger and the electric vehicle. The method can include transmitting, by the charger in the communication, to the electric vehicle, a data structure. The data structure can include a field for a minimum current with a value for the field that is less than zero. The method can include configuring, by the charger subsequent to transmission of the data structure comprising the value for the minimum current, the session for bidirectional power delivery between the charger and the electric vehicle, via the power cable.

At least one aspect is directed to an electric vehicle. The electric vehicle can include memory and one or more processors. The one or more processors can execute a communication between a charger and the electric vehicle to establish a session, via a power cable, for bidirectional power delivery between the charger and the electric vehicle. The one or more processors can receive, in the communication from the charger, a data structure comprising a field for a minimum current with a value for the field that is less than zero. The one or more processors can determine, subsequent to receipt of the data structure, the session is capable of bidirectional power delivery, via the power cable, between the charger and the electric vehicle.

At least one aspect is directed to a system that can include a charger comprising memory and one or more processors. The one or more processors can detect an electric vehicle connected to the charger. The one or more processors can execute, via one of a power cable or a network, a handshake process between the charger and the electric vehicle to establish a session. The session can be for bidirectional power delivery between the charger and the electric vehicle. The one or more processors can transmit, via one of the power cable or the network, in the handshake process to the electric vehicle, a communication. The communication can include a field indicative of a minimum current. The field can include a value that is less than zero. The one or more processors can receive, via one of the power cable or the network, in the handshake process, from the electric vehicle a confirmation. The confirmation can be responsive to the value. The confirmation can be indicative of a limitation of one of power or energy for the electric vehicle to provide to the charger. The one or more processors can configure, responsive to the one of the communication or the confirmation, the session for bidirectional power delivery between the charger and the electric vehicle, via the power cable.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
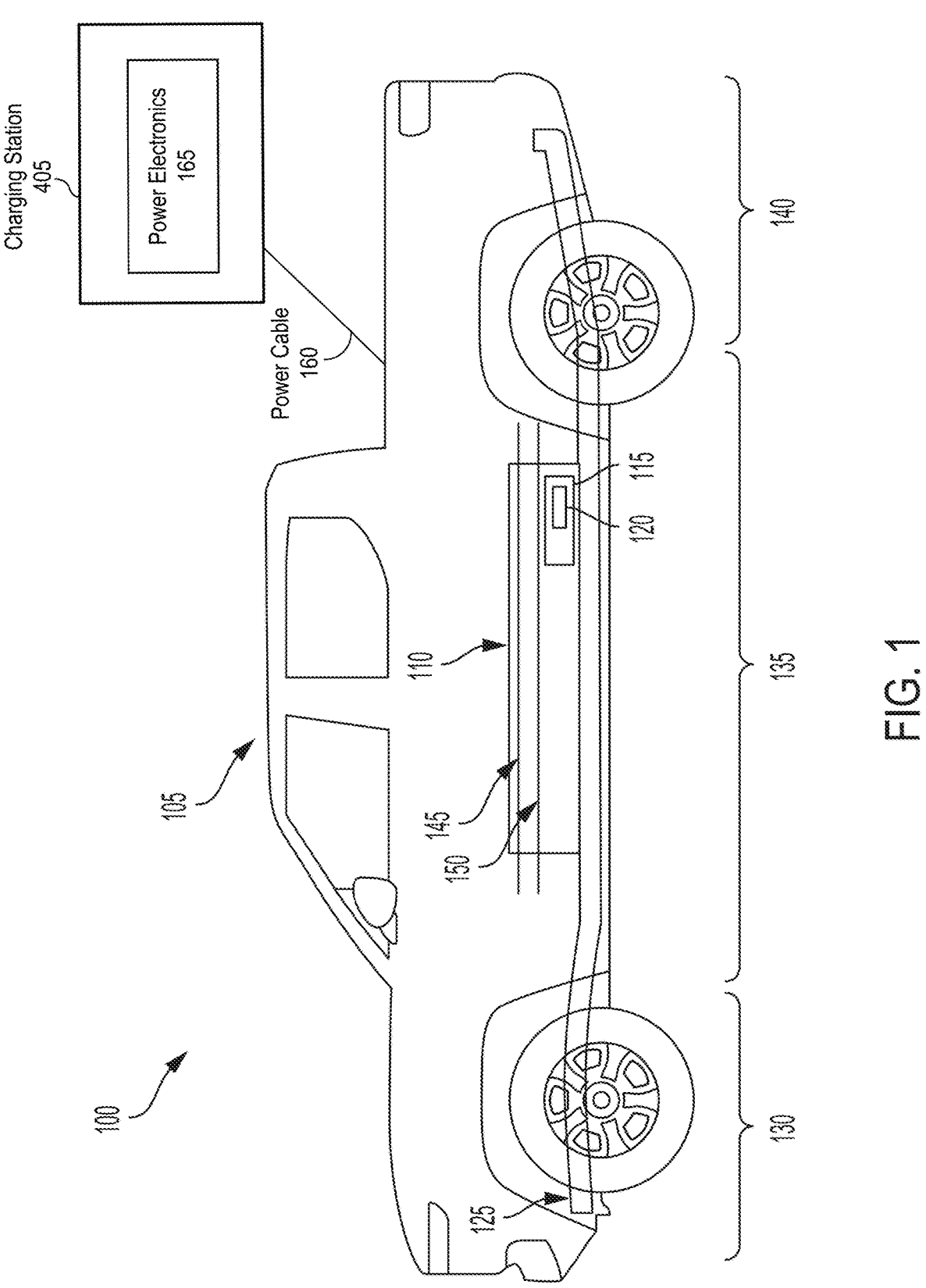
FIG. 1 depicts an example electric vehicle connected to a charging station.

Following below are more detailed descriptions of various concepts related to, and implementations of, methods, apparatuses, and systems of establishing a session for a bidirectional charging between an EV and an EV charging station, or a charger. The various concepts introduced above and discussed in greater detail below may be implemented in any of numerous ways.

This disclosure is generally directed to systems and methods to establish a bidirectional charging session between an electric vehicle (EV) and an EV charging station (e.g., a base stations, EV charger, or EV distributor). It can be challenging to accurately and efficiently establish a charging session between different EVs and EV chargers that can include or use different hardware or software systems. This technical challenge can result in a mismatch between the communication protocols utilized by different EVs and EV chargers having different configurations. In such instances, a communication used for configuring a charging session may be difficult to form. Without accurately establishing a configuration for an EV charger with respect to an EV with which the EV charger may communicate, the conveyance of power between the EV and the charger can be unreliable, inefficient, or incapable of accessing certain functionalities that could otherwise be accessible had the EV and the charger utilized the same communication protocol.

This technical solution provides a handshake process that can accurately and efficiently establish a charging session configured with functionality through which power can be conveyed reliably and without unnecessary computing resource or network resource utilization. For example, this technical solution can provide a handshake process that can accurately and efficiently configure a charging session that leverages various functionality of the charging station and the electric vehicle, such as bidirectional charging. This technical solution can improve the reliability with which power is conveyed during the charging session by providing a mechanism with which hardware constraints for minimum and maximum current can be shared between the charging station and electric vehicle, thereby allowing for bidirectional charging. For example, the present solution can execute a handshake and establish a bidirectional session utilizing communications that can be implemented on various EVs and EV chargers. The present solution can use an EV charger to execute a handshake process between the charger and an electric vehicle to establish a session for bidirectional power delivery between the charger and the electric vehicle. During the handshake process, the EV charger can transmit to an EV a data structure. The data structure can be transmitted to the EV via a power cable connecting the EV to the EV charger, or via a network. The data structure can include a field for a minimum current with a value for the field that is less than zero. The EV charger can configure, subsequent to transmission of the data structure, the session for bidirectional power delivery between the charger and the electric vehicle.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

FIG. 1 further illustrates a charging station 405, which can also be referred to as a charger 405, and which can include power electronics 165 for providing bidirectional power to and from the EV 105. Charger 405 can be connected with the EV 105 via a power cable 160. Power cable 160 can conduct or transmit electrical power between the charger 405 and EV 105. Power cable 160 can also conduct or transmit electrical or electronic signals, including analog and digital communications between the EV 105 and charger 405.

Figure 2A:
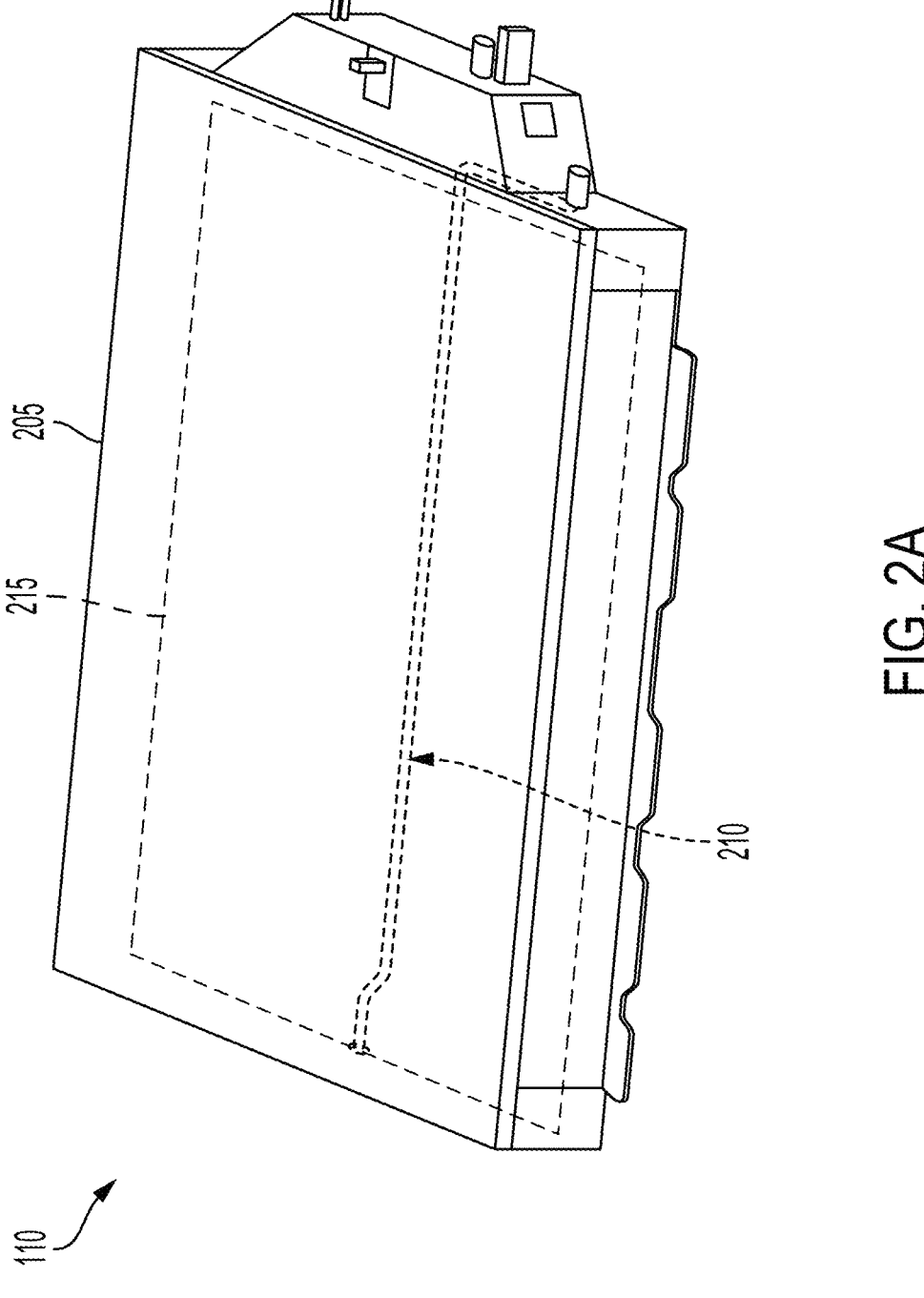
FIG. 2A depicts an example of one or more battery packs.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The housing 205 can include a shield on the bottom or underneath the battery module 115 to protect the battery module 115 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 2B:
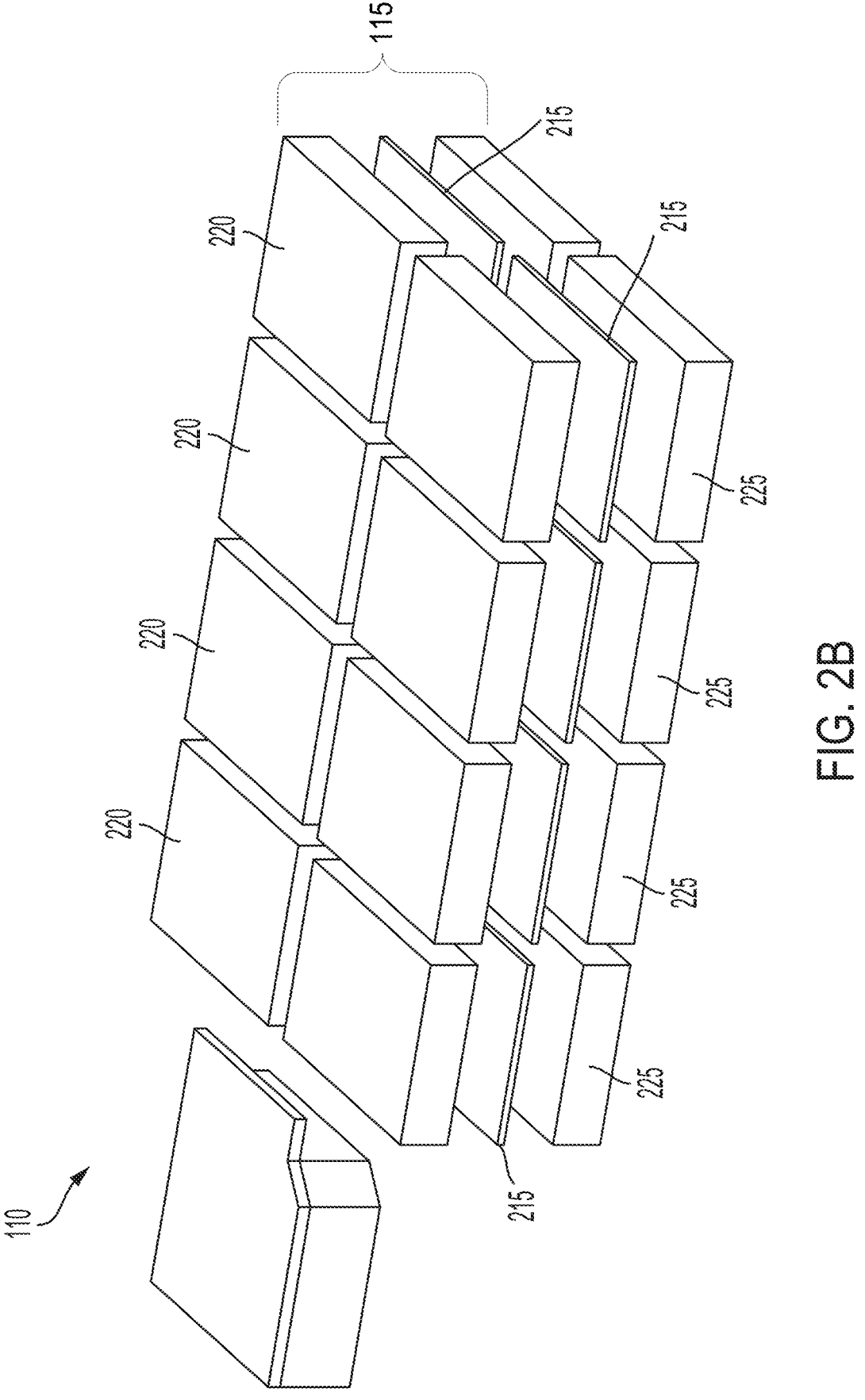
FIG. 2B depicts an example of one or more battery modules.
Figure 2C:
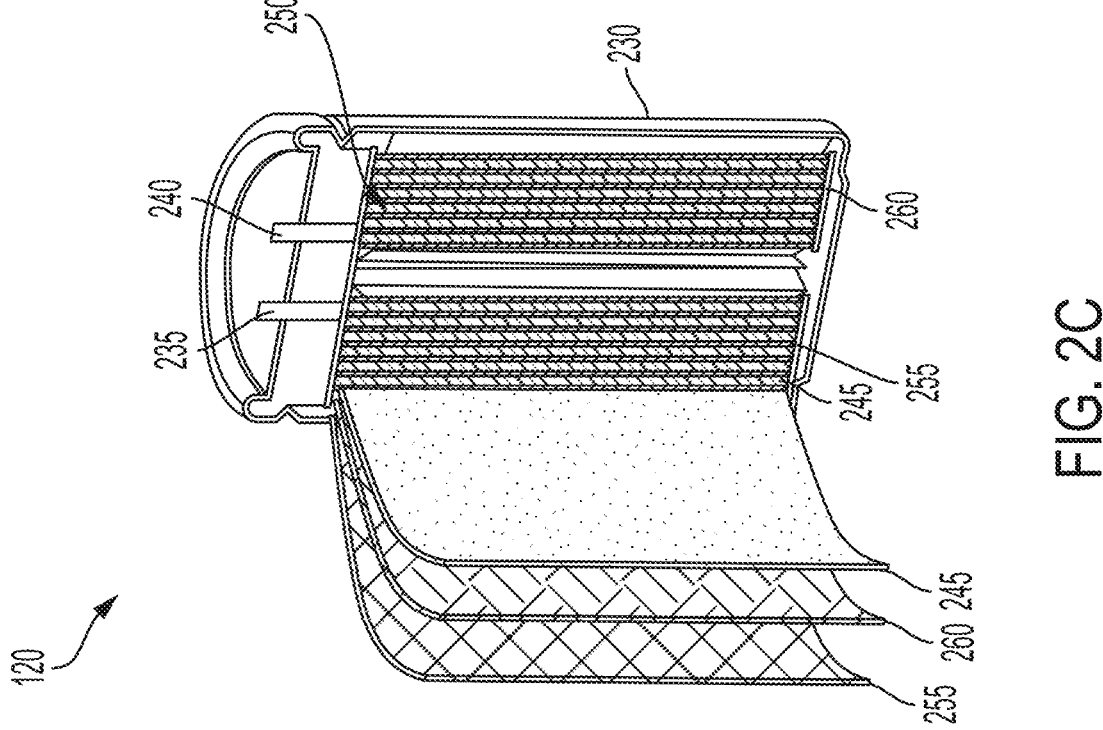
FIG. 2C depicts a cross-sectional view of an example of a battery cell.
Figure 2D:
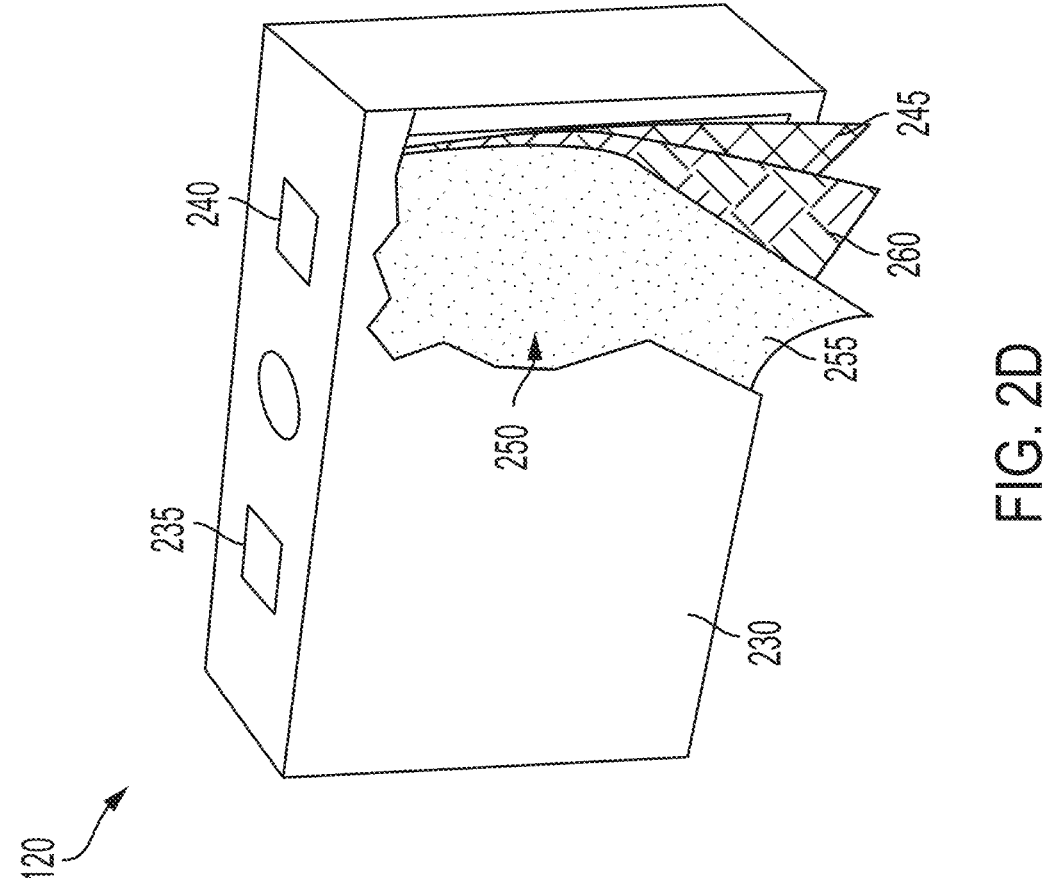
FIG. 2D depicts a cross sectional view of another example of a battery cell.
Figure 2E:
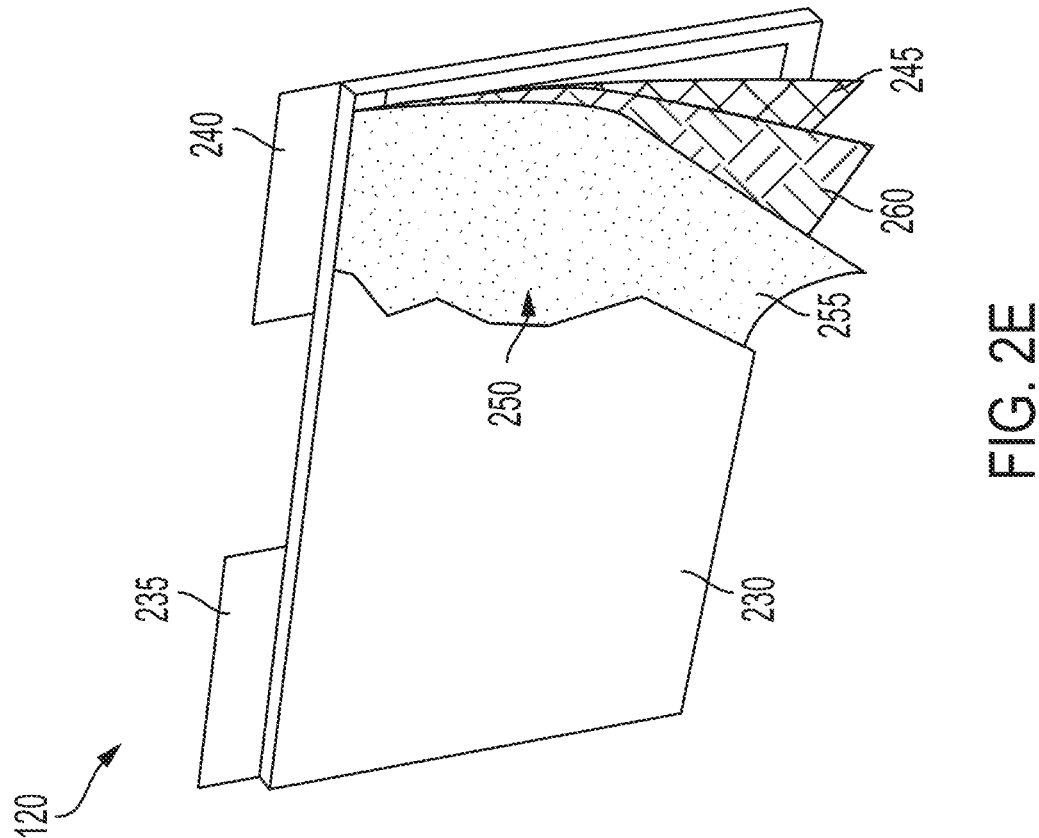
FIG. 2E depicts a cross sectional view of another example of a battery cell.

FIG. 2B depicts example battery modules 115, and FIGS. 2C, 2D and 2E depict an example cross sectional view of a battery cell 120. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a thermal component 215 in between the top submodule 220 and the bottom submodule 225. The battery pack 110 can include or define a plurality of areas for positioning of the battery module 115. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Battery cells 120 have a variety of form factors, shapes, or sizes. For example, battery cells 120 can have a cylindrical, rectangular, square, cubic, flat, pouch, elongated or prismatic form factor. As depicted in FIG. 2C, for example, the battery cell 120 can be cylindrical. As depicted in FIG. 2D, for example, the battery cell 120 can be prismatic. As depicted in FIG. 2E, for example, the battery cell 120 can include a pouch form factor. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 120 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 120. The housing 230 can be of various shapes, including cylindrical or rectangular, for example. Electrical connections can be made between the electrolyte material and components of the battery cell 120. For example, electrical connections to the electrodes with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

For example, the battery cell 120 can include a lithium-ion battery cells. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Solid electrodes or electrolytes can be or include organic polymeric-based electrolytes or inorganic electrolytes, for example phosphide-based or Sulfide-based solid-state electrolytes (e.g., $Li_3PS_4$, $Li_7P_3S_{11}$, $Li_2S$—$P_2S_5$, $Li_6PS_5Cl$). Yet further, some battery cells 120 can be solid state battery cells and other battery cells 120 can include liquid electrolytes for lithium-ion battery cells.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted in FIG. 2C, among others), elliptical, or ovular base, among others. The shape of the housing 230 can also be prismatic with a polygonal base, as shown in FIG. 2D, among others. As shown in FIG. 2E, among others, the housing 230 can include a pouch form factor. The housing 230 can include other form factors, such as a triangle, a square, a rectangle, a pentagon, and a hexagon, among others. In some embodiments, the battery pack may not include modules. For example, the battery pack can have a cell-to-pack configuration wherein battery cells are arranged directly into a battery pack without assembly into a module.

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 230 of the battery cell 120 is prismatic (e.g., as depicted in FIG. 2D, among others) or cylindrical (e.g., as depicted in FIG. 2C, among others), the housing 230 can include a rigid or semi-rigid material such that the housing 230 is rigid or semi-rigid (e.g., not easily deformed or manipulated into another shape or form factor). In examples where the housing 230 includes a pouch form factor (e.g., as depicted in FIG. 2E, among others), the housing 230 can include a flexible, malleable, or non-rigid material such that the housing 230 can be bent, deformed, manipulated into another form factor or shape.

The battery cell 120 can include at least one anode layer 245, which can be disposed within the cavity 250 defined by the housing 230. The anode layer 245 can include a first redox potential. The anode layer 245 can receive electrical current into the battery cell 120 and output electrons during the operation of the battery cell 120 (e.g., charging or discharging of the battery cell 120). The anode layer 245 can include an active substance. The active substance can include, for example, an activated carbon or a material infused with conductive materials (e.g., artificial or natural Graphite, or blended), lithium titanate ($Li_4Ti_5O_{12}$), or a silicon-based material (e.g., silicon metal, oxide, carbide, pre-lithiated), or other lithium alloy anodes (Li—Mg, Li—Al, Li—Ag alloy etc.) or composite anodes consisting of lithium and carbon, silicon and carbon or other compounds. The active substance can include graphitic carbon (e.g., ordered or disordered carbon with sp2 hybridization), Li metal anode, or a silicon-based carbon composite anode. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 120 can include at least one cathode layer 255 (e.g., a composite cathode layer compound cathode layer, a compound cathode, a composite cathode, or a cathode). The cathode layer 255 can include a second redox potential that can be different than the first redox potential of the anode layer 245. The cathode layer 255 can be disposed within the cavity 250. The cathode layer 255 can output electrical current out from the battery cell 120 and can receive electrons during the discharging of the battery cell 120. The cathode layer 255 can also release lithium ions during the discharging of the battery cell 120. Conversely, the cathode layer 255 can receive electrical current into the battery cell 120 and can output electrons during the charging of the battery cell 120. The cathode layer 255 can receive lithium ions during the charging of the battery cell 120.

The battery cell 120 can include an electrolyte layer 260 disposed within the cavity 250. The electrolyte layer 260 can be arranged between the anode layer 245 and the cathode layer 255 to separate the anode layer 245 and the cathode layer 255. The electrolyte layer 260 can help transfer ions between the anode layer 245 and the cathode layer 255. The electrolyte layer 260 can transfer $Li^+$ cations from the anode layer 245 to the cathode layer 255 during the discharge operation of the battery cell 120. The electrolyte layer 260 can transfer lithium ions from the cathode layer 255 to the anode layer 245 during the charge operation of the battery cell 120.

The redox potential of layers (e.g., the first redox potential of the anode layer 245 or the second redox potential of the cathode layer 255) can vary based on a chemistry of the respective layer or a chemistry of the battery cell 120. For example, lithium-ion batteries can include an LFP (lithium iron phosphate) chemistry, an NMC (Nickel Manganese Cobalt) chemistry, an NCA (Nickel Cobalt Aluminum) chemistry, or an LCO (lithium cobalt oxide) chemistry for a cathode layer (e.g., the cathode layer 255). Lithium-ion batteries can include a graphite chemistry, a silicon-graphite chemistry, or a lithium metal chemistry for the anode layer (e.g., the anode layer 245). For example, a cathode layer having an LFP chemistry can have a redox potential of 3.4 V vs. $Li/Li^+$, while an anode layer having a graphite chemistry can have a 0.2 V vs. $Li/Li^+$ redox potential.

Electrode layers can include anode active material or cathode active material, commonly in addition to a conductive carbon material, a binder, other additives as a coating on a current collector (metal foil). The chemical composition of the electrode layers can affect the redox potential of the electrode layers. For example, cathode layers (e.g., the cathode layer 255) can include high-nickel content (>80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and Lithium iron manganese phosphate ("LMFP"). Anode layers (e.g., the anode layer 245) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(m-ethyl acrylate) (PMA), poly(vinyl alcohol) (PVA), poly(vinyl acetate) (PVAc), polyacrylonitrile (PAN), polyisoprene (Plpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202 A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The electrolyte layer 260 can include or be made of a liquid electrolyte material. For example, the electrolyte layer 260 can be or include at least one layer of polymeric material (e.g., polypropylene, polyethylene, or other material) that is wetted (e.g., is saturated with, is soaked with, receives) a liquid electrolyte substance. The liquid electrolyte material can include a lithium salt dissolved in a solvent. The lithium salt for the liquid electrolyte material for the electrolyte layer 260 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. The electrolyte layer 260 can include or be made of a solid electrolyte material, such as a ceramic electrolyte material, polymer electrolyte material, or a glassy electrolyte material, or among others, or any combination thereof. The ceramic electrolyte material for the electrolyte layer 260 can include, for example, lithium phosphorous oxy-nitride ($Li_xPO_yN_z$), lithium germanium phosphate sulfur ($Li_{10}GeP_2S_{12}$), Yttria-stabilized Zirconia (YSZ), NASICON ($Na_3Zr_2Si_2PO_{12}$), beta-alumina solid electrolyte (BASE), perovskite ceramics (e.g., strontium titanate ($SrTiO_3$)), among others. The polymer electrolyte material (e.g., a hybrid or pseudo-solid state electrolyte) for electrolyte layer 260 can include, for example, polyacrylonitrile (PAN), polyethylene oxide (PEO), polymethyl-methacrylate (PMMA), and polyvinylidene fluoride (PVDF), among others. Whether the electrolyte layer 260 is a separator layer that can receive a liquid electrolyte (e.g., lithium ion batteries) or an electrolyte layer that can conduct ions without receiving a liquid electrolyte (e.g., solid-state batteries), the glassy electrolyte material for the electrolyte layer 260 can include, for example, lithium sulfide-phosphor pentasulfide ($Li_2S$—$P_2S_5$), lithium sulfide-boron sulfide ($Li_2S$—$B_2S_3$), and Tin sulfide-phosphor pentasulfide ($SnS$—$P_2S_5$), among others.

In examples where the electrolyte layer 260 includes a liquid electrolyte material, the electrolyte layer 260 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The electrolyte layer 260 can include at least one additive. The additives can be or include vinylidene carbonate, fluoroethylene carbonate, ethyl propionate, methyl propionate, methyl acetate, ethyl acetate, or a mixture of any two or more thereof. The electrolyte layer 260 can include a lithium salt material. For example, the lithium salt can be lithium perchlorate, lithium hexafluorophosphate, lithium bis(fluorosulfonyl)imide, lithium bis(trifluorosulfonyl) imide, or a mixture of any two or more thereof. The lithium salt may be present in the electrolyte layer 260 from greater than 0 M to about 1.5 M.

Figure 3:
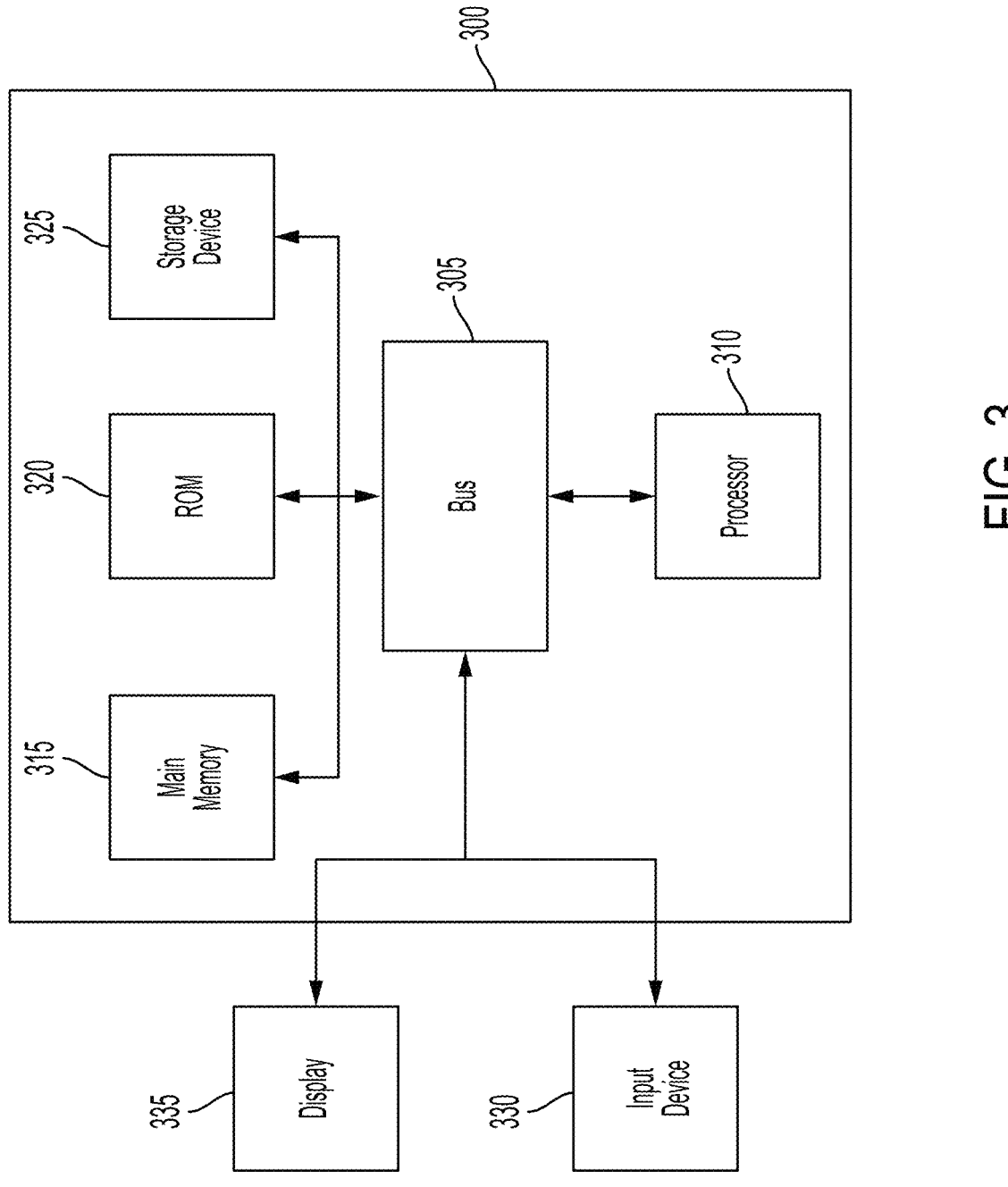
FIG. 3 is a block diagram illustrating an example architecture for a computer system that can be employed to implement elements of the systems and methods described and illustrated herein.

FIG. 3 depicts an example block diagram of an example computer system 300. The computer system or computing device 300 can include or be used to implement a data processing system or its components. The computing system 300 includes at least one bus 305 or other communication component for communicating information and at least one processor 310 or processing circuit coupled to the bus 305 for processing information. The computing system 300 can also include one or more processors 310 or processing circuits coupled to the bus for processing information. The computing system 300 also includes at least one main memory 315, such as a random access memory (RAM) or other dynamic storage device, coupled to the bus 305 for storing information, and instructions to be executed by the processor 310. The main memory 315 can be used for storing information during execution of instructions by the processor 310. The computing system 300 may further include at least one read only memory (ROM) 320 or other static storage device coupled to the bus 305 for storing static information and instructions for the processor 310. A storage device 325, such as a solid state device, magnetic disk or optical disk, can be coupled to the bus 305 to persistently store information and instructions.

The computing system 300 may be coupled via the bus 305 to a display 335, such as a liquid crystal display, or active matrix display, for displaying information to a user such as a driver of the electric vehicle 105 or other end user. An input device 330, such as a keyboard or voice interface may be coupled to the bus 305 for communicating information and commands to the processor 310. The input device 330 can include a touch screen display 335. The input device 330 can also include a cursor control, such as a mouse, a trackball, or cursor direction keys, for communicating direction information and command selections to the processor 310 and for controlling cursor movement on the display 335.

The processes, systems and methods described herein can be implemented by the computing system 300 in response to the processor 310 executing an arrangement of instructions contained in main memory 315. Such instructions can be read into main memory 315 from another computer-readable medium, such as the storage device 325. Execution of the arrangement of instructions contained in main memory 315 causes the computing system 300 to perform the illustrative processes described herein. One or more processors in a multi-processing arrangement may also be employed to execute the instructions contained in main memory 315. Hard-wired circuitry can be used in place of or in combination with software instructions together with the systems and methods described herein. Systems and methods described herein are not limited to any specific combination of hardware circuitry and software.

Although an example computing system has been described in FIG. 3, the subject matter including the operations described in this specification can be implemented in other types of digital electronic circuitry, or in computer software, firmware, or hardware, including the structures disclosed in this specification and their structural equivalents, or in combinations of one or more of them.

Figure 4:
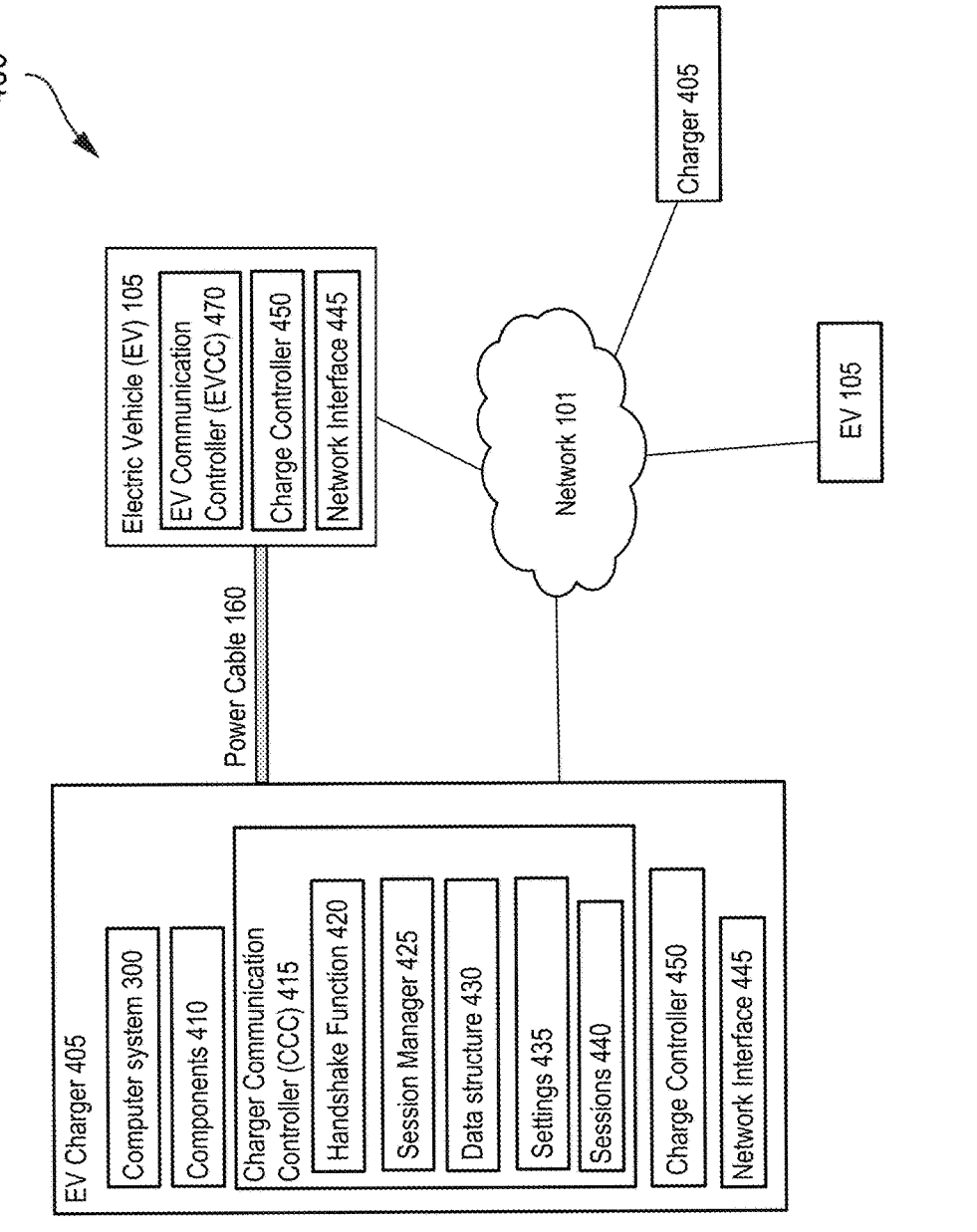
FIG. 4 is a block diagram illustrating an example of a system to perform a handshake and establish a session for bidirectional EV charging.

Referring to FIG. 4, among others, an example system 400 of the present solution for establishing a bidirectional charging session between an EV charger 405 and an EV 105 is illustrated. As shown in FIG. 4, a system 400 can include one or more EV charging stations 405. The EV charging stations 405 can include or be referred to as one or more chargers 405. The EV charging stations 405 can communicate with one or more EVs 105 via a network 101. An EV 105 can connect to an EV charger 405 via a power cable 160.

A charger 405 can include one or more computer systems 300 and one or more components 410, which can include one or more power cables 160 and one or more power electronics 165 for providing a bidirectional power flow between the charger 405 and an EV 105. EV charger 405 can include one or more network interfaces 445, one or more charge controllers 450 and one or more charger communication controllers (CCC) 415. A CCC 415 can include one or more handshake functions 420, one or more session managers 425, one or more data structures 430, one or more settings 435 or one or more sessions 440. EV 105 can include one or more EV communication controllers (EVCC) 470 with a same or similar functionality as the CCC 415. The EV 105 can include one or more charge controllers 450. The EV 105 can include one or more network interfaces 445.

Charging station or a charger 405 can include any combination of hardware and software for providing power to an EV 105 or receiving power from an EV 105. Charger 405 can be a bidirectional charging station and can include any combination of hardware and software for providing and drawing power or energy to or from one or more battery packs 110, battery modules 115 or battery cells 120 of an EV 105 at any rate, voltage or current setting or range. Charger 405 can include scripts, functions and computer code stored in memory and executed or operating on one or more processors to implement any functionality of the charger 405. Charger 405 can include a computer system 300, including one or more processors 310 and memories 315, 320 and 325, each of which can store computer code, scripts, functions and instructions to implement any functionality of the charger 405 or its components or functions.

Charger 405 can include electrical and power circuitry, control logic or circuits, power electronics, power supply circuitry, energy storage devices, such as batteries, and other hardware for storing, controlling, modulating or otherwise managing power, energy or electricity provided to, or drawn from, EVs 105. Charger 405 can include electric vehicle charging equipment that can include a power and control box and power cord or a cable. Charger 405 can include circuitry for converting alternating current (AC) to direct current (DC), such as an AC-DC converter. Charger 405 can include DC-AC converters or DC-DC converters.

Charger 405 can include one or more bidirectional chargers which can be electrically coupled to an electrical grid. Charger 405 can draw electricity from the grid to charge EVs 105 and can receive electricity from the batteries (e.g., 110, 115 or 120) of the EV 105 and provide the drawn electricity to the electrical grid. Charger 405 can include or configure any level of EV charging equipment, such as level-1, level-2, level-3 or any other charging equipment level. Charging station 405 can be set to operate, including provide or draw electricity, at any voltage, current or power level. For example, charger 405 can provide electricity to EVs or draw power from EVs 105 at any voltage level, such as 120V, 208-240V or 400-900V. Similarly, charger 405 can provide electricity to EVs 105 or draw electricity from EVs 105 at any power levels, such as anywhere between 5 and 800 kW, such as 5 kW, 10 kW, 20 kW, 30 kW, 50 kW, 80 kW, 100 kW, 150 kW, 220 kW, 250 kW, 300 kW, 350 kW, 500 kW, or more.

Charging station 405 can include components 410, such as any electrical, electronic, mechanical, electromechanical, analog or digital parts, components, circuits, devices, systems or subsystems. Components 410 can include any combination of circuitry for providing bidirectional power to or from an EV 105, such as a control box housing power electronics 165 or circuitry or a power cord or a cable 160 that can connect the charger 405 to the EV 105.

Components 410 can include power electronics 165 which can include any electrical or electronic circuitry, combining or including for example, AC-DC converters, DC-DC converters, DC-AC converters, any combination of power transistors, contactors, capacitors, inductors, resistors, diodes, switches, transformers, relays and other electrical or electronic components. Power electronics 165 can include or form structures, such as half and full bridge circuits, rectifiers, filters, multi-function circuits, single or multi-stage chargers, including for example chargers with resonant half-bridge converts that can utilize one or more inductors and one or more capacitors, such as the LLC converters and single or multi-directional DC-DC converters. Components 410 or power electronics 165 can processors, such as processors 310 as well as memory, such as 315, 320 or 325 memories, that can store scripts, computer code or instructions to be accessed or executed by electronic microcontrollers or devices, such as processors 310. Components 410 can include one or more energy storage systems, including batteries. Components 410 can include lithium-ion, solid-state or any other type and form of battery type.

Component 410 of the charger 405 can include a power cable 160, which can also be referred to as the power cord 160. Power cable or cord 160 can be attached to or coupled with power electronics 165. The power cable 160 can include one or more electrical conductor wires or lines, including lines or wires for high power throughput. For instance, power cable 160 can include thick or low gauge aluminum or copper wires or lines for conducting high power, high voltage or high current between EV 105 and charger 405, such as for example 10 gauge, 8 gauge, 6 gauge, 5 gauge, 4 gauge, 3 gauge, 2 gauge, 1 gauge wire or less than 1 gauge wire or wire lines. Power cable 160 can include one or more conductor line or wires for electronic or electrical signals, control signals or digital communication between the EV 105 and charger 405. For example, power cable 160 can include one or more thin or high gauge aluminum or copper wires or lines for conducting analog or digital communication signals between the EV 105 and charger 405, such as for example 20 gauge, 25 gauge, 30 gauge, 40 gauge or more than 40 gauge wire or wire lines. Component 410 can include a power plug for plugging into an EV 105. Component 410 can include communication circuitry, such as processors or microcontrollers or computer systems 300 for receiving, sending and processing communication via the wires or lines.

Computer system 300 can be deployed at any charger 405 or any EV 105. Computer system 300 can implement any functionality of a charger 405, including for example components 410, CCC 415, charge controller 450 or network interface 445. Computer system 300 can implement any functionality of an EV 105, including for example functionalities of EVCC 470, charge controller 450 or network interface 445.

Charge controller 450 can include any combination of hardware and software for controlling or managing charge or amount of power provided to, or received by a device comprising the charge controller, such as an EV 105 or a charger 405. Charge controller 450 can include scripts, functions and computer code stored in memory and executed or operating on one or more processors to implement any functionality of the charge controller 450. For example, a charge controller 450 deployed on an EV 105 can include circuitry or functionality, including instructions stored on a memory and processed by a processor, for controlling or managing power provided to or received by the EV 105. For example, a charge controller 450 deployed on charger 405 can include circuitry or functionality, including instructions stored on a memory and processed by a processor, for controlling or managing power provided to or received by the charger 405.

Charge controller 450 can set and control a rate of charge to provide to EV 105 or a rate of charge to draw from an EV 105, and to and from a charger 405. Charge controller 450 can set a power level, a voltage level or a current level for an EV charge, in either direction. Charge controller 450 can set up and maintain sessions 440 using session managers 425. Charge controller 450 can maintain a rate of charge via a power cable between the charger 405 and EV 105 based on settings 435. For example, charge controller 450 can set, establish or maintain a rate of charge based on a setting for a maximum current or a minimum current. For example, charge controller 450 can set, establish or maintain a rate of charge based on a setting for a maximum power or a minimum power. For example, charge controller 450 can set, establish or maintain a rate of charge based on a setting for a maximum voltage or a minimum voltage. For example, charge controller 450 can set, establish or maintain a rate of charge based on a setting for a maximum energy or a minimum energy. Charge controller 450 can set, establish or maintain a rate of charge to or from an EV 105 and to or from a charger 405 based on a single value that can denote or correspond to power, current, voltage or energy in either direction. Charge controller 450 can include circuitry, devices or systems for pre-charging of a device, such as a charger 405 or EV 105, including safely powering up and increasing power applied to various components to allow for their safe power up.

Network interface 445 can include any combination of hardware and software for communicating via a network 101. Network interface 445 can include scripts, functions and computer code stored in memory and executed or operating on one or more processors to implement any functionality of the network interface 445, such as communicate via a network 101. Network interface 445 can include functionality for communicating via network 101 using any network communication protocol such as Transmission Control Protocol (TCP)/Internet Protocol (IP), user datagram protocol (UDP), or any other communication protocol used for communicating over a network 101. Network interface 445 can include network communication ports and hardware for receiving and sending communications over the network 101 or via a power cable 160. Network interface 445 can include the functionality to encode and decode, send and receive any information, commands, instructions, data structures, values or other data between the EV 105 and charger 405. Network interface 445 can include the functionality to transmit between the EV 105 handshakes or other communications for establishing a charging session between the EV 105 and charger 405.

Network interface 445 can include any combination of hardware and software for communicating via power cable 160. Network interface 445 can include scripts, functions and computer code stored in memory and executed or operating on one or more processors to communicate via a power cable 160. For example, network interface 445 can include the functionality to communicate via one or more high gauge wires or lines for communication on the power cable 160. Network interface 445 can include the functionality, including circuitry, processors and memory, to send, analog or digital communication between the EV 105 and charger 405, via one or more lines in the power cable 160.

Charger communication controller (CCC) 415 can include any combination of hardware and software for establishing and controlling communication between a charger 405 and an EV 105. CCC 415 can be deployed on a charger 405 and can include scripts, functions and computer code stored in memory and executed or operating on one or more processors to implement any functionality of the CCC 415. CCC 415 functionality can include establishing communication with an EV 105, establishing connections, performing handshake functions 420 with an EV 105, receiving or sending data structures 430, settings 435 and establishing sessions 440 for exchanging power between the EV 105 and charger 405. CCC 415 can exchange information with an EVCC 470 at an EV 105 and can establish and maintain one or more sessions 440 with an EVCC 470 at an EV 105. CCC 415 can include, establish, run, manage and maintain any one or more of: handshake functions 420, session managers 425, data structures 430, settings 435 or sessions 440.

Sessions 440 can include any sessions for providing or receiving power or charge between an EV 105 and a charger 405. Sessions 440 can include one or more sessions for providing charge to or from EV 105, or providing charge to or from a charger 405. Session 440 can include a session with any one or more EVs 105. Session 440 can be a session for charging a particular EV 105, or receiving charge from an EV 105, from which the charger 405 has received a setting 435. The direction of charge, from an EV 105 to a charger 405 or from a charger 405 to an EV 105, can be established for the session 440 based on a setting 435. For example, a value of a setting can be indicative of a direction. A negative value can indicate charge or power movement from an EV 105 to a charger 405. A negative value can indicate charge or power movement from a charger 405 to an EV 105. A positive value can indicate charge or power movement from an EV 105 to a charger 405. A positive value can indicate charge or power movement from a charger 405 to an EV 105. Session 440 can include any settings 435, data or instructions corresponding to a particular EV 105 or a charger 405, including for example an EV 105 driver's account or information, such as a payment processing account or information.

Session manager 425 can include any combination of hardware and software for establishing and managing sessions 440, including any charging sessions 440 between an EV 105 and charger 405. Session manager 425 can include scripts, functions and computer code stored in memory and executed or operating on one or more processors to implement any functionality of the session manager 425. Session manager 425 can be deployed at charger 405 or EV 105. Session manager 425 can establish a connection and/or session with an EV 105. Session manager 425 can establish a connection and/or session with a charger 405. Session manager 425 can communicate with EV 105 or a charger 405 to set, establish, monitor or maintain the session 440, including establishing, setting or controlling any one or more of a voltage, current, energy or power received from or delivered to EV 105. Session manager 425 can set, establish, monitor or maintain the rate of charge to and from EV 105, state of charge or state of health of EV battery pack 110, temperature of components 410 corresponding to the session 440 as well as any settings 435 or configurations for the particular session 440.

Handshake function 420 can include any combination of hardware and software for negotiating setting up a communication channel, a connection or a session between EV 105 and charger 405. Handshake function 420 can include be implemented in scripts, functions and computer code stored in memory and executed or operating on one or more processors to implement any communication for setting up a session 440. Handshake function 420 can include ordered set of communications to be exchanged between a charger 405 and an EV 105 to negotiate the flow of power to or from an EV 105 or to or from a charger 405. Handshake function 420 can include exchanges, transmissions or instructions that can indicate the flow of power, amount of power, voltage, current or energy to receive or provide. Handshake function 420 can include transmissions to include data structures 430 and settings 435. Handshake function 420 can include the functionality to identify and determine protocols for communication used by EV 105 or charger 405. Handshake function 420 can communicate requests and responses using any protocol, such as a protocol for communication between EV 105 and charger 405. Handshake function 420 can identify or determine a matching protocol based on one or more transmissions received from an CCC 415 or EVCC 470.

Handshake function 420 can utilize the identified or determined protocol to complete a handshake process and negotiate a session 440 and its settings 435 between an EV 105 and charger 405. Handshake function 420 can include or implement one or more stages for forming a session 440, such as a stage in which a secure connection between EV 105 and charger 405 is established or confirmed. Handshake function 420 can include or implement a stage at which a communication between EV 105 and charger 045 is established or confirmed. Handshake function 420 can include or implement a stage at which a protocol of communication between the EV 105 and charger 405 is identified, negotiated or determined. Handshake function 420 can include or implement a stage at which a pre-configuration for a session 440 is completed, such as when data for session 440 is exchanged between the EV 105 and charger 405. Handshake function 420 can include, trigger or implement a pre-charging routine for an EV 105 or a charger 405.

Data structure 430 can include any data set organized in a computer. Data structure can include any one or more data or values, which can be organized as an input, an array, a linked list, a stack, a table, a matrix, a queue, a binary tree, a heap or a graph. Data structure 430 can include a table with one or more values. Data structure 430 can include one or more fields that can include one or more values. Data structure 430 can be represented with analog or digital signals, including in binary values. Data structure 430 can include input values or settings 435 for handshake function 420 or CCC 415 or EVCC 470.

Settings 435 can include any one or more adjustment values or data used for establishing or maintaining a session 440. Settings 435 can include values or indications that can denote or be indicative of energy, power, voltage or current. Settings 435 can include a value indicating a maximum current value for a power, charge or energy being transmitted or received. Settings 435 can include a value indicating a minimum current value for a power, charger or energy being transmitted or received. Settings 435 can include a value indicating a maximum voltage value for a power, charge or energy being transmitted or received. Settings 435 can include a value indicating a minimum voltage value for a power, charger or energy being transmitted or received. Settings 435 can include a value indicating a maximum power value for a power, charge or energy being transmitted or received. Settings 435 can include a value indicating a minimum power value for a power, charger or energy being transmitted or received. Settings 435 can indicate a total amount of energy to be transmitted or received.

Settings 435 can include a positive value, a zero or a negative value. The settings 435 value can be indicative of direction of power, such as whether power is being received or transmitted by either EV 105 or charger 405. For example, settings 435 that includes a negative value can indicate that power, energy, current or voltage is set so as to draw power from the EV 105 and to the charger 405. For example, settings 435 that includes a negative value can indicate that power, energy, current or voltage is set so as to draw power from the charger 405 and to the EV 105. For example, settings 435 that includes a positive value can indicate that power, energy, current or voltage is set so as to draw power from the EV 105 and to the charger 405. For example, settings 435 that includes a positive value can indicate that power, energy, current or voltage is set so as to draw power from the charger 405 and to the EV 105. For example, settings 435 that includes a zero value can indicate that power, energy, current or voltage is set so as to draw power from the EV 105 and to the charger 405. For example, settings 435 that includes a zero value can indicate that power, energy, current or voltage is set so as to draw power from the charger 405 and to the EV 105. Using the settings 435, a handshake function 420 on a CCC 415 or EVCC 470 can negotiate and set up a session 440 for drawing power from an EV 105, or providing power to an EV 105, depending on the value in the settings 435.

Settings 435 can include a value stored or inserted in a data structure 430, where the value can be a negative value indicative of amperage, including average, maximum or minimum amperage of current drawn from an EV, such as −10 A (or Amperes), −15 A, −20 A, −30 A, −40 A, −50 A, −60 A, −70 A, −80 A, −90 A, −100 A, −120 A, −150 A, −180 A, −200 A, −400 A, −600 A, −800 A, −1000 A or any other negative value corresponding to the amperage of current to be drawn or received from the EV 105. Settings 435 can include a positive value indicative of amperage including average, maximum or minimum amperage of current provided or charged to the EV, such as 10 A (or Amperes), 15 A, 20 A, 30 A, 40 A, 50 A, 60 A, 70 A, 80 A, 90 A, 100 A, 120 A, 150 A, 180 A, 200 A, 400 A, 600 A, 800 A, 1000 A or any other positive value corresponding to the amperage of current to be provided to or charged to the EV 105.

Settings 435 can include a value stored or inserted in a data structure 430, where the value can be a negative value indicative of power including average, maximum or minimum power, drawn from an EV, such as −1 kW (or kilo Watts), −2 kW, −3 kW, −5 kW, −7 kW, −10 kW, −15 kW, −20 kW, −30 kW, −40 kW, −50 kW, −70 kW, −100 kW, −150 kW, −200 kW, −250 kW, −300 kW, −400 kW, −500 kW, −700 kW, −1000 kW or any other negative value corresponding to the power to be drawn or received from the EV 105. Settings 435 can include a positive value indicative of power including average, maximum or minimum power, provided or charged to the EV, such as 1 kW, 2 kW, 3 kW, 5 kW, 7 kW, 10 kW, 15 kW, 20 kW, 30 kW, 40 kW, 50 kW, 70 kW, 100 kW, 150 kW, 200 kW, 250 kW, 300 kW, 400 kW, 500 kW, 700 kW, 1000 kW or any other positive value corresponding to the power to be provided to or charged to the EV 105.

Settings 435 can include a value stored or inserted in a data structure 430, where the value can be a negative value indicative of voltage including average, maximum or minimum voltage, to be used to draw power from an EV, such as −110 V (or volts), −120V, −220V, −240V, −300V, −350V, −400V, −500V, −600V, −700V, −800V, −900V, −1000V, −1200V, −1500V, −1800V, −2000V or any other negative value corresponding to the voltage used to draw or receive power or charge from the EV 105. Settings 435 can include a positive value indicative of voltage including average, maximum or minimum voltage, used to provide or charge power to the EV, such as 110V, 120V, 220V, 240V, 300V, 350V, 400V, 500V, 600V, 700V, 800V, 900V, 1000V, 1200V, 1500V, 1800V, 2000V or any other positive value corresponding to the voltage used to provide power or charge the EV 105.

Settings 435 can include a value stored or inserted in a data structure 430, where the value can be a negative value indicative of amount of energy including average, maximum or minimum energy, to be received or drawn from an EV, such as −0.5 kWh (or kilo-Watt hours), −1 kWh, −2 kWh, −4 kWh, −6 kWh, −8 kWh, −10 kWh, −15 kWh, −20 kWh, −25 kWh, −30 kWh, −35 kWh, −40 kWh, −45 kWh, −50 kWh, −60 kWh, −70 kWh, −80 kWh, −90 kWh, −100 kWh, −120 kWh, −130 kWh, −140 kWh, −150 kWh, −180 kWh, −200 kWh, −250 kWh, −300 kWh, −400 kW or any other negative value corresponding to the energy to be drawn or received from the EV 105. Settings 435 can include a positive value indicative of energy including average, maximum or minimum energy, to provide or charge to the EV, such as 0.5 kWh, 1 kWh, 2 kWh, 4 kWh, 6 kWh, 8 kWh, 10 kWh, 15 kWh, 20 kWh, 25 kWh, 30 kWh, 35 kWh, 40 kWh, 45 kWh, 50 kWh, 60 kWh, 70 kWh, 80 kWh, 90 kWh, 100 kWh, 120 kWh, 130 kWh, 140 kWh, 150 kWh, 180 kWh, 200 kWh, 250 kWh, 300 kWh, 350 kWh, 400 kWh or any other positive value corresponding to the energy to be provided or charged to the EV 105.

EV communication controller 470, also referred to as the EVCC 470, can communicate, interface with or otherwise interact with a CCC 415. EVCC 470 can be a counterpart of the CCC 415. For example, system 400 can include a charger 405 including a CCC 415, while an EV 105 connected to the charger 405 via a power cable 160 can include an EVCC 470 which can include any one or more functionality or features of the CCC 415. For example, EVCC 470 can include its own handshake functions 420, session managers 425, data structures 430, settings 435 and sessions 440. EVCC 470 and CCC 415 can communicate with each other to implement the communication handshakes, using their own or each other's handshake functions 420, data structures 430 and settings 435 to establish and maintain sessions 440 between each other.

In some aspects, the example system 400 can include a charger 405 that can include a memory (e.g., 315 or 325) and one or more processors (e.g., 310). The one or more processors 310 can execute instructions, computer code or instructions stored in memory 315 or 325 of the charger 405. Charger 405 can utilize one or more processors 310 of the charger 405 to execute a handshake process between the charger 405 and an EV 105. The handshake process can be executed using one or more handshake functions 420. The handshake process can establish a session 440 for bidirectional power delivery between the charger 405 and the EV 105. The charger 405 can transmit, in the handshake process to the EV 105, a data structure 430. The data structure 430 can include a field for a minimum current. The data structure 430 can include a field for a minimum power, a minimum voltage or a minimum amount of energy. The field of the data structure 430 can include a setting 435 for a minimum current. The field of the data structure 430 can include a setting 435 for a minimum power, minimum voltage or a minimum energy amount. The field of the data structure 430 can include a value for the field that is less than zero. The value can indicate a current, a voltage, a power or energy amount or level to provide or receive. The value can indicate an amount of current, power, voltage or energy to transfer, draw or otherwise discharge from the battery pack 110 of the EV 105. For example, the value can indicate the amount of current, power, voltage or energy to provide to the battery pack 110 of the EV 105. The charger 405 can configure the session 440 for bidirectional power delivery between the charger 405 and the EV 105. The charger 405 can configure or setup the session 440 subsequent to transmission of the data structure 430 comprising the value (e.g., 435), such as the value for the minimum current. The charge 405 can configure, establish, or set up the session 440, in response to the transmission of the data structure 430 comprising the value.

The charger 405 can determine a type of protocol with which the EV 105 communicates. For example, handshake functions 420 of CCC 415 or EVCC 470 can utilize one or more requests and responses between each other to determine or identify the protocol used by the EV 105 or charger 405. The charger 405 can transmit, based on a match between the type of protocol and a predetermined type of protocol, the data structure 430 comprising the field with the value less than zero. CCC 415 and the EVCC 470 can determine that their protocols match based on a request and response between the CCC 415 and EVCC 470 being implemented in the same or a predetermined protocol. For example, EV 105 can send a transmission in a particular protocol and if a charger 405 responds to the request using the same protocol, a match in the protocol can be determined between the two. The charger 405 can determine a match between the protocol and a predetermined type of protocol based on a request or a response to a request received by either CCC 415 on a charger 405 or EVCC 470 on EV 105.

The charger 405 can determine, subsequent to transmission of the data structure 430 comprising the field with the value, that a power cable 160 between the charger 405 and the EV 105 is secure. For example, a processor 310 of the charger 405 can determine that a power cable 160 is secure based on or responsive to the transmission of the data structure 430, or based on a sensor, detector or a switch on the power cable 160, charger 405 or EV 105 being activated or closed. For example, a transmission in a handshake process (e.g., handshake function 420) can indicate that the power cable 160 is safely attached to the EV 105. The charger 405 can receive, subsequent to the determination, a target value (e.g., settings 435) for current from the EV 105 that is less than zero. The charger 405 can receive, subsequent to configuration of the session 440 for bidirectional power delivery, a target value (e.g. 435) for current from the electric vehicle that is less than zero. The charger 405 can initiate, responsive to receipt of the target value less than zero, a discharge of the EV 105. For example, the charger 405 can initiate a discharge of the EV 105 for a particular duration of time, such as 15 seconds, 30 seconds, 1 minute, 2 minutes, 3 minutes, 5 minutes, 10 minutes, 15 minutes, 20 minutes, 30 minutes, 45 minutes, an hour or more than an hour. The duration of time can correspond to the time between the instances in which EVCC 470 or CCC 415 periodically checks if the target value or the maximum (e.g., max) current value, exchanged between CCC 415 and EVCC 470, has changed.

Charger 405 can provide, subsequent to configuration of the session 440 for bidirectional power delivery, an indication (e.g. 435) that a maximum current for the session is less than zero. The charger 405 can discharge the EV 015, subsequent to provision of the indication (e.g., 435) that the maximum current is less than zero. The charger 405 can discharge the EV 105 by a set amount of energy or charge, in response to or based on the indication. For example, an indication can include a negative value that can correspond to one or more of a maximum current, maximum power, maximum voltage or maximum amount of energy or charge to be drawn out of a battery pack 110 of the EV 105. For example, an indication can include a negative value that can correspond to one or more of a minimum current, minimum power, minimum voltage or minimum amount of energy or charge to be drawn out of a battery pack 110 of the EV 105. For example, an indication can include a positive value that can correspond to one or more of a maximum current, maximum power, maximum voltage or maximum amount of energy or charge to charged or provided to the battery pack 110 of the EV 105. For example, an indication can include a positive value that can correspond to one or more of a minimum current, minimum power, minimum voltage or minimum amount of energy or charge to be provided to the battery pack 110 of the EV 105.

The charger 405 can provide, subsequent to configuration of the session 440 for bidirectional power delivery, an indication (e.g., 435) that a maximum current for the charger is less than zero. The charger 405 can provide the indication in response to a target current value received from the EV 105 via a power cable 160. For example, CCC 415 of the charger 405 can send the indication that maximum current for the charger is less than zero, in response to receiving a transmission from the EVCC 470 indicating that target current value is negative. The charger can receive, prior to or subsequent to provision of the indication (e.g. 435) that the maximum current is less than zero, from the EV 105, an indication of a target value for current (e.g., 435) that is less than zero. The charger 405 can discharge, responsive to the indication (e.g., 435) of the target value, power from the EV 105. For example, the charger 405 can provide an indication that maximum current has a negative value in response to EV 105 providing a negative target current. EV 105 can provide a negative target current value periodically, such as less than every one second, or every 1 second, 5 seconds, 15 seconds, 30 seconds, minute, 2 minutes, 5 minutes, 10 minutes, 15 minutes, 30 minutes or more.

Charger 405 can set a maximum current value (e.g., 435) for the charger 405 that is greater than zero. Charger 405 can receive a target current value (e.g., 435) from the EV 105 that is greater than zero. Charger 405 can charge, based on the maximum current value greater than zero (e.g., 435) and the target current value greater than zero (e.g., 435), the EV 105 in accordance with the target current value (e.g. 435). For example, EVCC 470 of the EV 105 can send a positive target current value (e.g., 435) to the CCC 415 of the charger 405. In response to receiving the positive target current value, the charger 405 can provide charge or energy to the battery pack 110 of the EV 105.

Charger 405 can set a maximum current value for the session (e.g., 435) that is less than zero. Charger 405 can receive power from the EV 105 and change the maximum current value for the session to greater than zero. Charger 405 can transmit power to the EV 105. The power transmitted can be based on or responsive to the changed maximum current value. Charger 405 can switch, based on a check made periodically by the EV 105, the session 440 from power delivery to the EV 105 to power receipt from the EV 105.

Charger 405 can detect that a power cable 160 of the charger 405 is plugged into the EV 105. Charger 405 can make this determination based on a sensor or detector, such as a contact sensor, proximity sensor or any other sensor sending a signal indicating that the power cable is plugged. Charger 405 can make this determination based on a switch on the power cable 160, charger 405 or EV 105 being closed, indicating that the power cable 160 is plugged into the EV 105. Charger 405 can execute a first state of the handshake process (e.g. 420) subsequent to detection that the charger 405 is plugged into the EV 105. The first state of the handshake process (e.g., handshake function 420) can include a determination that a type of protocol of the EV 105 matches the type of protocol of the charger 405. The first state of the handshake process (e.g., 420) can include a configuration or setup of the session 440 for bidirectional charging. For example, the configuration or setup of the session 440 can be implemented in response to the protocol and the information, such as a data structure value indicative of minimum or maximum current. Charger 405 can execute a second state of the handshake process (e.g., 420) subsequent to configuration of the session 440 for bidirectional charging. The second state of the handshake process (e.g. 420) can include a determination that the power cable 160 between the charger 405 and the EV 105 is secure. The second state can include a pre-charge routine. The pre-charge routine can include, for example, gradual powering up or increasing power or voltage on one or more parts of the charger 405 or EV 105. For example, pre-charge routine can increase voltage, current or power in one or more components steadily over a period of a second, 2 seconds, 5 seconds, 10 seconds, 15 seconds, 30 seconds or a minute, until the one or more components reach the full operating power. Charger 405 can receive, subsequent to completion of the first state and the second state of the handshake process, a target current value (e.g., 435) from the EV 105 that is less than zero. Charger 405 can initiate, responsive to receipt of the target current value that is less than zero, a discharge of the EV 105. For example, charger 405 can draw power from EV 105 at a current, power or voltage that is based on, or indicated by, the target value provided by the EV 105 or max current, voltage or power provided by the charger 405.

The system 400 can detect that a power cable 160 of the charger 405 is plugged into the EV 105 and execute a first state of the handshake process (e.g., 420). The handshake process can include one or more exchanges of requests and responses back and forth between the CCC 415 and EVCC 470, such as those discussed in, for example, FIG. 5. The handshake process can include a request from either CCC 415 or EVCC 470 to the other one to the two to check if they can use the same protocol for communication. The process can include a response back to the initiating device to respond with the same or a different protocol indication. The handshake can then include communication exchanges to determine whether the power cable 160 is safely attached and whether one or both devices can implement the pre-charging of their relevant components. The handshake can further include exchanges of negative or positive target current from the EVCC 470, in response to which a negative or positive Max current can be established by the CCC 415.

For example, the first state of the handshake process can be done subsequent to detection that the charger 405 is plugged into the EV 105 or that the charger 405 is connected to the EV 105 via power cable 160 that is securely connected to the EV 105. The first state of the handshake process (e.g., 420) can include a determination that a type of protocol of the EV 105 matches the type of protocol of the charger. The first state of the handshake process (e.g., 420) can include a configuration or a setup of the session 440 for bidirectional charging. The charger 405 can execute a second state of the handshake process (e.g., 420) subsequent to configuration of the session 440 for bidirectional charging. The second state of the handshake process (e.g., 420) can include a determination that the power cable 160 between the charger 405 and the EV 105 is secure. The second state of the handshake process (e.g., 420) can include a pre-charge routine or a process. Charger 405 can close, subsequent to completion of the first state and the second state of the handshake process, one or more contactors, switches or other circuits that can be used to convey power between the EV 105 and the charger 405. Charger 405 can receive, subsequent to completion of the first state and the second state of the handshake process, a target current value from the EV 105 that is less than zero. Charger 405 can initiate a discharge of the EV 105 responsive to the receipt of the target current value that is less than zero.

Depending on the type of a charger 405 used, chargers can operate at varying levels of current, voltage and power. For example, level 1 charger 405 can operate at around 120V and about 1.3 kW to 2.4 kW range, which can correspond to about 10 A to 20 A current range. For example, level 2 charger 405 can operate at around 208V-240V and about 3 kW to 19 kW range, which can correspond to about 12 A to 90 A of current range. For example, level 3 charger 405 can operate at around 400V-900V and about 50 kW to 350 kW, which can correspond to about 55 A to 875 A of current range.

For example, charger 405 can initiate a discharge or power draw from the EV 105 based on, or responsive to, the magnitude of the target current value that is less than zero. For example, charger 405 can initiate a discharge at a particular current level that is indicative of the target current value, such as up to –10 A, –15 A, –20 A, –30 A, –40 A, –50 A, –60 A, –70 A, –80 A, –90 A, –100 A, –120 A, –150 A, –180 A, –200 A, –400 A, –600 A, –800 A, –1000 A or any other value. For example, charger 405 can initiate a discharge at a particular power level that is indicative of the target value, such as up to –1 kW, –2 kW, –4 kW, –6 kW, –8 kW, –10 kW, –15 kW, –20 kW, –25 kW, –30 kW, –35 kW, –40 kW, –45 kW, –50 kW, –60 kW, –70 kW, –80 kW, –90 kW, –100 kW, –120 kW, –130 kW, –140 kW, –150 kW, –180 kW, –200 kW, –250 kW, –300 kW, 350 kW, 400 kW or any other value. For example, charger 405 can initiate a discharge at a particular voltage level that is indicative of the target value, such as up to as –110 V, –120V, –220V, –240V, –300V, –350V, –400V, –500V, –600V, –700V, –800V, –900V, –1000V, –1200V, –1500V, –1800V, –2000V or other value. For example, charger 405 can initiate a discharge of a particular energy amount that is indicative of the target value, such as up to as –0.5 kWh, –1 kWh, –2 kWh, –4 kWh, –6 kWh, –8 kWh, –10 kWh, –15 kWh, –20 kWh, –25 kWh, –30 kWh, –35 kWh, –40 kWh, –45 kWh, –50 kWh, –60 kWh, –70 kWh, –80 kWh, –90 kWh, –100 kWh, –120 kWh, –130 kWh, –140 kWh, –150 kWh, –180 kWh, –200 kWh, –250 kWh, –300 kWh, 400 kWh or other value.

The system 400 can detect that a power cable 160 of the charger 405 is plugged into the EV 105 and execute a first state of the handshake process (e.g., 420) subsequent to detection that the charger is plugged into the EV 105. The first state can include a determination that a type of protocol of the EV 105 matches the type of protocol of the charger 405 and a configuration of the session 440 for bidirectional charging. Charger 405 can execute a second state of the handshake process (e.g., 420) subsequent to configuration of the session 440 for bidirectional charging. The second state of the handshake process (e.g., 420) can include a determination that the power cable 160 between the charger 405 and the EV 105 is secure. The second state of the handshake process can include a pre-charge routine. Charger 405 can receive, subsequent to completion of the first state and the second state of the handshake process, a target current value from the EV 105 that is less than zero. Charger 405 can initiate, responsive to receipt of the target current value that is less than zero, a discharge of the EV 105. Charger 405 can, subsequent to initiation of the discharge of the EV 105, set a maximum current value for the charger 405 that is greater than zero and charge the EV 105 in the session 440. For example, charger 405 can in response to the initiation of the discharge of 105, set up maximum current, power or voltage for the charger 405 that is greater than zero and charge the EV 105. Charger 405 can be located in, or near, a residential building, such as a garage of a single family or a multi-family house, a condominium, townhouse, a home or a building, a driveway of a family home, a parking space of an apartment building or a residential garage, or any other residential object. Charger 405 can be located in, or near, a commercial building, such as a vehicle charging facility, commercial garage or a parking, factory, airport, restaurant, mall, shopping center, or any commercial object. The protocol of the handshake process can include a vehicle-to-home protocol.

The technical solutions described herein can include an EV 105 that can include a memory (e.g., main memory 315, storage device 325) and one or more processors (e.g., processor 310) to execute a handshake process (e.g., handshake function 420) between a charger 405 and the EV 105 to establish a session 440 for bidirectional power delivery between the charger 405 and the EV 105. The charger 405 of the EV 105 can receive, in the handshake process (e.g., handshake function 420) from the charger 405, a data structure 430 comprising a field for a minimum current with a value for the field that is less than zero. The EV 105 can determine, subsequent to receipt of the data structure, the session 440 is capable of bidirectional power delivery between the charger 405 and the electric vehicle 105.

The EV 105 can periodically check a maximum current limit set by the charger 405 for the session 440. EV 105 can periodically check a maximum power, voltage or energy limit for the session 440. For example, EV 105 can periodically send a target value to the charger 405, such as a target current, power, voltage or energy value. The EV 105 can determine, based on the periodic check, that the maximum current limit set by the charger is less than zero. The one or more processors of the EV 105 can transmit, to the charger 405, a target current value that is less than zero. The one or more processors of the EV 105 can allow a discharge of the electric vehicle in accordance with the target current value established by the electric vehicle. For example, EV 105 can be discharged at a current set based on the target current value, such as –10 A, –30 A, –50 A or any other current that discharges the battery pack 110 of the EV 105 towards the charger 405. Likewise, EV 105 can allow a charge of the EV in accordance with the target current value, such as 10 A, 30 A, 50 A or any other current that charges the battery pack 110 of the EV 105 from the charger 405.

The present solution can relate to a system 400 that can include a charger 405 comprising memory (e.g., main memory 315, storage device 325) coupled to one or more processors (e.g., processor 310). The charger 405 execute instructions from the memory (e.g., main memory 315, storage device 325) to detect an EV 105 connected to the charger 405. For example, the processor 310 can detect an EV 105 by communicating to the EV 105 via power cable 160 or a network 101. The charger 405 can execute, via one of a power cable 160 or a network 101, a communication, which can include a handshake process (e.g., handshake function 420), between the charger and the EV 105 to establish a session 440 for bidirectional power delivery between the charger 405 and the EV 105. The charger 405 can receive, via one of the power cable 160 or the network 101, in the communication or the handshake process (e.g., handshake function 420) to the EV 105, a communication. The communication can include a field indicative of a minimum current, a minimum power, a minimum voltage or a minimum amount of energy. The field can include a value that is less than zero. The magnitude of the value (e.g., less than zero) can be indicative of one of the current, power, voltage or energy to be drawn or received from the EV 105. The charger 405 can transmit, via one of the power cable or the network, in the handshake process, from the EV 105 a confirmation responsive to the value, the confirmation indicative of a limitation of one of current, voltage power or energy for the electric vehicle to provide to the charger. The charger 405 can configure, responsive to the one of the communication or the confirmation, the session 440 for bidirectional power delivery between the charger 405 and the EV 105. The session 440 can be set up in accordance with the limitation on one of current, voltage, power of energy to be provided to the EV 105.

Figure 5:
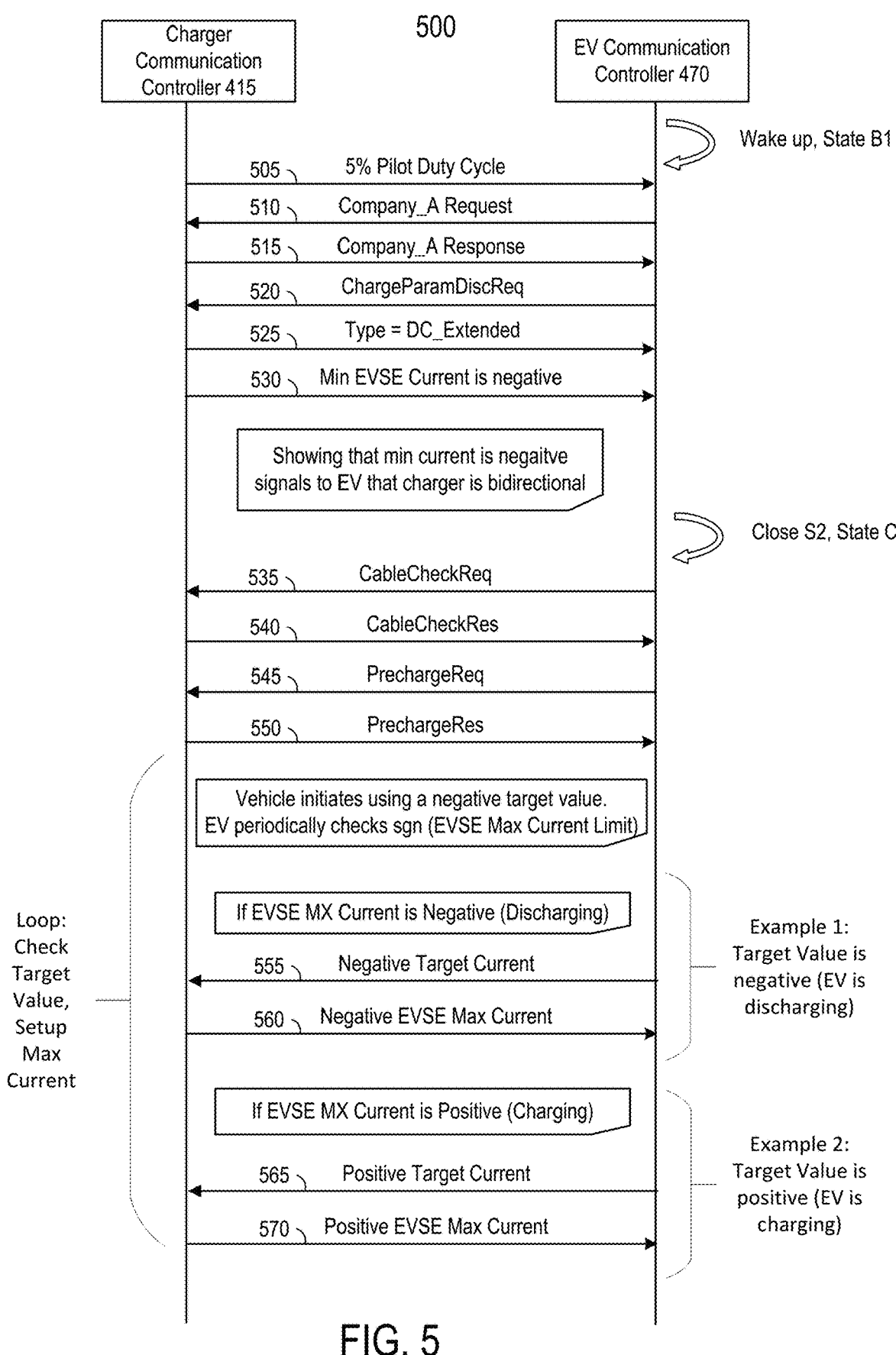
FIG. 5 is a flow diagram illustrating an example of communications exchanged in establishing of a session for bidirectional EV charging.

FIG. 5 illustrates an example communication flow 500 including ACTS 505-570 performing a communication, including for example a handshake negotiation, between the EV 105 and the EV charger 405 to establish a bidirectional charging session. The communication of FIG. 5 can be implemented, for example, via communication lines of the power cable 160. The communication flow 500 can be performed by one or more system or component depicted in FIGS. 1-4, including, for example, an EV charger or EV. ACTS 505-570 of FIG. 5 represent example exchanges between an EVCC 470 of an EV 105 and a CCC 415 of a charger 405 in the course of a negotiating and establishing a session 440 for bidirectional charging using a handshake process of the present solution.

At the start of the communication flow 500, an EV 105 can be at a Wake up, State B1 state. The EVCC 470 of the EV 105 can send to a CCC 415 of a charger 405 a transmission 505. The transmission 505 from the EVCC 470 can indicate a 5% pilot duty cycle to be used in the communication between the EV and CS 405. Following, or responsive to, the transmission 505, EVCC 470 can send a request 510 to the CCC 415. The request 510 can be constructed pursuant to a particular protocol or type of protocol. The protocol can be established by a manufacturer of the charger 405 or electric vehicle 105. The protocol can be established by an administrator of the charger 405 or electric vehicle 105. The protocol can be established by a third-party entity, for example. The protocol can be established by a company or organization, such as Company_A, in which case the protocol can be referred to as a Company_A protocol. For example, the request 510 can be referred to as a Company_A request 510, the response to which can be referred to as a Company_A response 515, for example. The request 510 (e.g., Company_A Request) can denote a request to check whether the CCC 415 of the charger 405 can configure or establish a session 440 using the Company_A protocol. The Company_A protocol can be a protocol for bidirectional charging, based on which a session 440 can be negotiated and formed.

In response to the request 510 (e.g., Company_A request), the CCC 415 can send a reply response 515 (e.g., Company_A response). The reply response 515 can be indicative that the CCC 415 of the charger 405 does communicate using the protocol. Based on the request 510 and response 515 exchange the CCC 415 and EVCC 470 can determine that they can establish a session 440 using a protocol, such as a Company_A protocol. By exchanging a request 510 in one protocol and a response 515 in the same protocol, the CCC 415 and EVCC 470 can determine that their protocols match, or that for each one of the charger 405 and EV 105 their predetermined protocol is matched by the other device (e.g., EV 105 or charger 405).

EVCC 470 can then send to the CCC 415 a request 520 for charge parameters (e.g., ChargeParamDiscReq), which can ask for or include charge parameters. In response to the request 520 for charge parameters, CCC 415 can then send to the EVCC 470 a transmission 525 indicating a type of transmission (e.g., Type=DC_Extended), which can denote that charger 405 seeks to provide a direct voltage charge. CCC 415 can send a transmission 530 indicating that the minimum EVSE current is negative. Transmission 530 can indicate to EV 105 that charger 405 is bidirectional and can both receive and send power.

At close S2, State C of the EV 105, EVCC 470 of the EV 105 can send a request 535 to check whether the power cable 160 is safely connected (e.g., CableCheckReq) between the EV 105 and charger 405. In response to the request 535, CCC 415 of the charger 405 can send a response 540 (e.g., CableCheckRes) indicating whether the power cable 160 is securely connected. In the event, the cable 160 is not connected, the driver may be notified to correctly connect the power cable 160. In the event that the cable 160 is safely attached, EVCC 470 can send a request 545 to start a pre-charge routine or function (e.g., prechargeReq). In response to the pre-charge request 545, CCC 415 can send a response 550 (e.g., PrechargeRes) which can correspond to or indicate a start or implementation of a pre-charging routine.

At this point, the EVCC 470 of the EV 105 can send transmission 555 which can include or indicate a negative target value (e.g., settings 435) in a data structure 430 to the CCC 415 of the charger 405. Transmission 555 can be used in the event that the EV 105 is seeking to discharge the battery pack 110 and provide energy to the charger 405. EVCC 470 can send a negative target current via transmission 555 (or a negative target power, voltage or energy amount) to the CCC 415. CCC 415 can respond to the received negative target current (or a power, voltage or energy) in 555 with a response 560, which can include or indicate a negative EVSE Max Current response. Transmission 560 can confirm that charger 405 has established the operation at such a negative current (or power, voltage or energy) value or level. The negative current (or power, voltage or energy) can denote that power is being provided to the charger 405 from the EV 105, via the power cable 160. The negative current (or power, voltage or energy) can denote that power is being provided to the EV 105 from the charger 405, via the power cable 160.

The EVCC 470 of the EV 105 can send a transmission 565 which can include or indicate a positive target value (e.g., settings 435) in a data structure 430 to the CCC 415 of the charger 405. Transmission 565 can indicate that EV 105 is seeking to charge the battery pack 110 and receive energy to the charger 405. In transmission 565, EVCC 470 can send a positive target current (or a positive target power, voltage or energy amount) to the CCC 415. In response to transmission 565, CCC 415 can send a transmission 570 which can include or indicate a positive target current (or such as a positive EVSE Max Current). Transmission 570 can confirm that charger 405 has established the operation at a positive current (or power, voltage or energy) value or level. The positive current (or power, voltage or energy) can denote that power is being provided to the EV 105 from the charger 405, via the power cable 160. The positive current (or power, voltage or energy) can denote that power is being provided to the charger 405 from the EV 105, via the power cable 160.

Using any one or more of ACTS 555-570, a loop of communication between the CCC 415 and EVCC 470 can be established so that EV 105 and charger 405 exchange target values and EVSE max values between each other continuously, periodically, or based on any other time interval or responsive to an event or condition. For example, EVCC 470 can periodically send a target value 555 or 565 (e.g., positive or negative target current, power, voltage or energy) to the CCC 415 and CCC 415 can respond with a positive or negative EVSE max setting 560 or 570 (e.g., EVSE Max current, voltage, power or energy level). This exchange can occur periodically every up to 1 second, 5 seconds, 10 seconds, 15 seconds, 20 seconds, 30 seconds, 45 seconds, 1 minute, 2 minutes, 3 minutes, 5 minutes, 10 minutes, 15 minutes or more. Using this approach, charging or discharging of the EV 105 can continue so long as the EVSE Max value remains unchanged (e.g., negative for discharging of EV 105 or positive for charging of EV 105). The charging or discharging of the EV 105 can continue until, for example, EV 105 or charger 405 sends a signal to stop.

Using the ACTS 555-570, the CCC 415 and EVCC 470 can switch between a charging and a discharging session. For example, using ACTS 555 and 560, the EV 105 can be discharged by the charger 405 for one or more loops or one or more periodic checks. During the one of the periodic checks, EVCC 470 can send to the CCC 415 a transmission 565 (e.g., a positive target current or a positive target value) instead of the transmission 555 (e.g., a negative target current or a negative target value) that was being sent in the prior periodic checks. At that point, the system can switch to the charging mode and the CCC 415 can provide a 570 transmission in return. Similarly, if the EV 105 is being charged, transmissions 565 and 570 can be transmitted between the EVCC 470 and CCC 415 periodically. At one point, a transmission 555 (e.g., negative target current) can be received instead of the transmission 565 (e.g., positive target current). At that point, the system can switch from the charging mode to the discharging mode. Various circumstances can cause or trigger a charger 405 or the EV 105 to set a negative or a positive target current or target value such that the charger 405 either receives power from the EV 105 or provides power to EV 105. These circumstances can include, for example, a GUI input from a user device, such as a driver's mobile device or an EV 105, a command sent from a user's remote device or an EV 105 received by the charger 405 via a network 101, a charger 405 losing power or experiencing power failure, an EV 105 losing power or experiencing power failure or a low battery pack 110 level at an EV 105.

Figure 6:
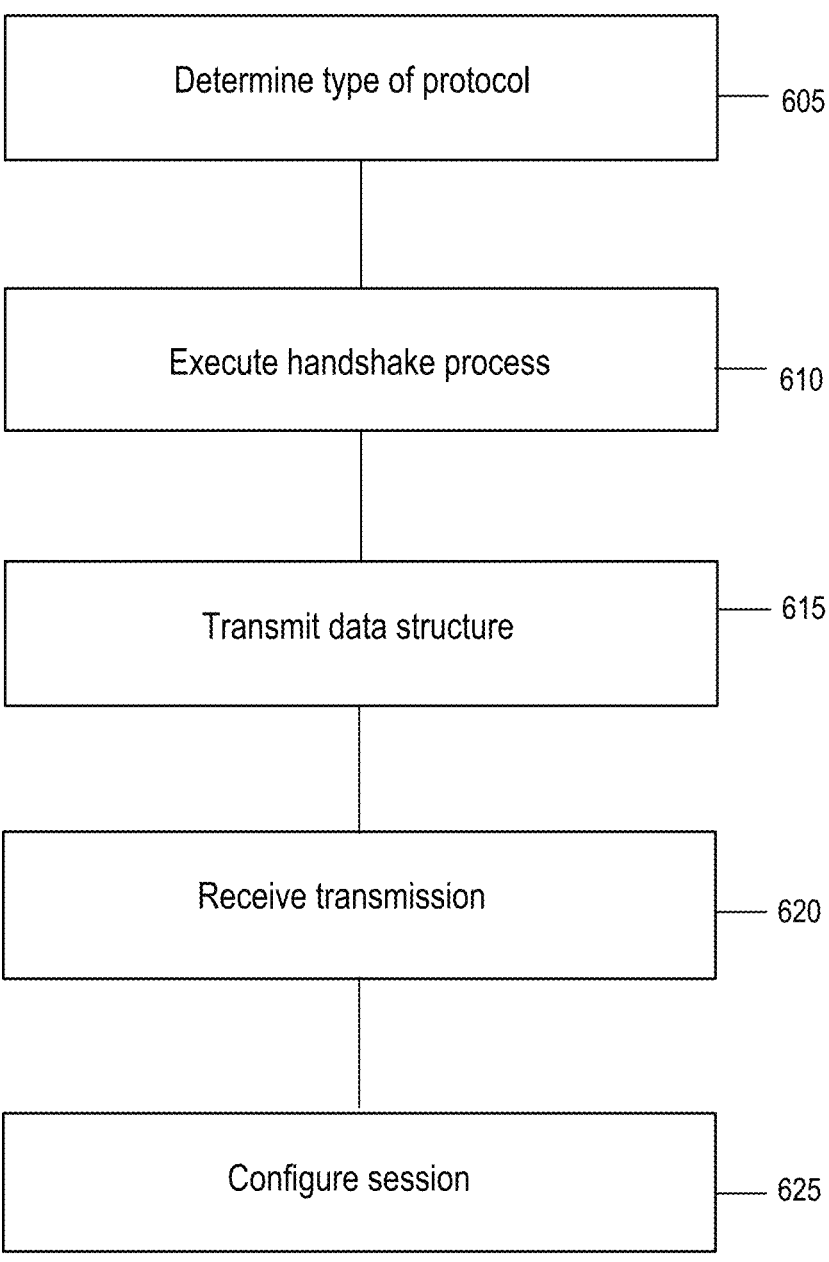
FIG. 6 is a flow diagram illustrating an example method for establishing a session for bidirectional EV charging.

FIG. 6 illustrates an example method 600 of the system in FIG. 4 to establish a bidirectional charging session. The method 600 can be performed by one or more system or component depicted in FIGS. 1-4, including, for example, an EV charger or EV. Method 600 can include some of the same or similar tasks as those discussed in the example 500 of FIG. 5. The method 600 can include includes ACTS 605-625. At ACT 605, the method determines a type of protocol. At ACT 610, the method executes handshake process. At ACT 615, the method transmits data structure. At ACT 620, the method receives transmission. At ACT 625, the method configures session.

At ACT 605, the method determines a type of protocol. The charger can determine or identify a type of protocol with which the electric vehicle communicates. The electric vehicle can determine or identify a type of protocol with which charger communicates. The charger or the electric vehicle can determine or identify the protocol based on information or transmissions exchanged over a power cable or via a network. Electric vehicle or the charger can send a request using a protocol over the power cable to the charger or the electric vehicle connected to it, and receive a response that is responsive to the request. Based on the received response, the electric vehicle or the charger can identify or determine the protocol used.

At ACT 610, the method executes handshake process. The charger comprising memory and one or more processors can execute a communication, which can include a handshake process, between the charger and an electric vehicle to establish a session for bidirectional power delivery between the charger and the electric vehicle. The communication, or the handshake process of the communication, can include one or more transmissions between the communication controller of the charger and the communication controller of the electric vehicle. For example, the communication or the handshake process can include a transmission indicating a duty cycle. The communication or the handshake process can include a transmission including a request to determine if the receiving charger or electric vehicle communicates in a particular protocol. The communication or the handshake process can include a transmission requesting or providing parameters for a charging session, such as a bidirectional session. The communication or the handshake process can include one or more states or stages. For example, a first state or stage of a handshake process can include a determining a communication protocol in ACT 605 and a configuration of the session. The configuration of the session can include parameters exchange between the electric vehicle and the charger. The communication or the handshake process can include a second state or a stage determining if the power cable between the charger and the electric vehicle is securely attacked. The second state or stage of the communication or the handshake process can include a pre-charge routine to safely power up electrical and electronic components or devices of the charger or electric vehicle. The communication can take place via one or more communication lines of the power cable connecting the charger with the electric vehicle.

At ACT 615, the method transmits data structure. The charger can transmit, during the communication, such as in the handshake process, to the electric vehicle, a data structure. The data structure can include a field. The field can be for a minimum current, voltage, power or energy amount. The field can include or store a value for the field that is less than zero. The charger or the electric vehicle can transmit, based on a match between the type of protocol and a predetermined type of protocol, the data structure comprising the field with the value less than zero. For example, the charger can transmit, to the electric vehicle, a maximum current for the charger that is less than zero. The charger can transmit to the electric vehicle a maximum voltage, power or energy level that is less than zero. The magnitude of the value transmitted (e.g., set, average, minimum or maximum current, voltage, power or energy) can correspond or indicate the current, voltage, power or energy amount level of the power to be received from the electric vehicle. When the value transmitted is positive (e.g., greater than zero), the value can indicate the set, average, minimum or maximum current, voltage, power or energy of the power to be provided to or charged to the electric vehicle.

At ACT 620, the method receives transmission. The charger can receive, subsequent to configuration of the session for bidirectional power delivery, a target value for current from the electric vehicle that is less than zero. The charger can determine, subsequent to transmission of the data structure comprising the field with the value, that a power cable between the charger and the electric vehicle is secure. The charger can receive, subsequent to the determination, a target value for current from the electric vehicle that is less than zero. The electric vehicle can receive the maximum setting value, such as a value that indicates the maximum current, voltage, power or energy amount. In the event where the maximum setting value is negative, the value can indicate the maximum current, voltage, power or energy amount that is drawn or received from the electric vehicle. In the event where the maximum setting value is positive, the value can indicate the maximum current, voltage, power or energy amount that is provided to the electric vehicle.

At ACT 625, the method configures session. The charger can configure, subsequent to transmission of the data structure comprising the value for the minimum current, the session for bidirectional power delivery between the charger and the electric vehicle. The charger can initiate, responsive to receipt of the target value less than zero and transmission of the maximum current for the charger less than zero, a discharge of the electric vehicle. The electric vehicle discharge can take place via the power cable connecting the charger and the electric vehicle. The charger can initiate, responsive to receipt of the target value that is greater than zero, charging of the electric vehicle. The electric vehicle charging can take place via the power cable connecting the charger and the electric vehicle.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. For example, instead of a negative value, a positive value can be used, or instead of a positive value, a negative value can be used. Similarly, instead of a charging of an EV, discharging can be implemented, and instead of a discharging, charging may be implemented. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An electric vehicle, comprising:
a memory and one or more processors to:
  execute a communication between a charger and the electric vehicle to establish a session for bidirectional power delivery between the charger and the electric vehicle via a power cable;
  transmit, in the communication and prior to conveyance of power in the session, a data structure comprising a field designated to store a value that is less than zero which indicates that the electric vehicle is configured to discharge power during the bidirectional power delivery; and
  cause, subsequent to transmission of the data structure comprising the field with the value that is less than zero and prior to delivery of power in the session to discharge power from the electric vehicle, a configuration of the session for the bidirectional power delivery between the charger and the electric vehicle via the power cable.

2. The electric vehicle of claim 1, wherein the field is for a minimum current.

3. The electric vehicle of claim 1, wherein the value is less than zero.

4. The electric vehicle of claim 1, comprising the one or more processors to:
  determine the power cable between the charger and the electric vehicle is secure; and
  transmit, subsequent to determination that the power cable is secure, a target value for current from the electric vehicle that is less than zero to cause the charger to initiate a discharge of the electric vehicle.

5. The electric vehicle of claim 1, comprising:
  receive, subsequent to the configuration of the session for the bidirectional power delivery, an indication that a maximum current for the session is less than zero; and
  discharge, subsequent to receipt of the indication that the maximum current is less than zero, the electric vehicle.

6. The electric vehicle of claim 1, comprising:
  receive, subsequent to the configuration of the session for the bidirectional power delivery, an indication that a maximum current for the charger is less than zero;
  provide, subsequent to receipt of the indication that the maximum current is less than zero, to the charger, an indication of a target value for current that is less than zero; and
  discharge, responsive to the indication of the target value, power from the electric vehicle.

7. The electric vehicle of claim 1, wherein a protocol of the communication comprises a vehicle-to-home protocol.

8. The electric vehicle of claim 1, comprising the one or more processors to:
  cause execution of a first state of the communication subsequent to detection that the charger is plugged into the electric vehicle, the first state comprising:
    determination that a type of protocol of the charger matches the type of protocol of the electric vehicle; and
    the configuration of the session for the bidirectional power delivery.

9. The electric vehicle of claim 1, comprising the one or more processors to:
  cause execution of a first state of the communication subsequent to detection that the charger is plugged into the electric vehicle, the first state comprising determination that a type of protocol of the charger matches the type of protocol of the electric vehicle;
  cause execution of a second state of the communication subsequent to the configuration of the session for the bidirectional power delivery, the second state comprising a pre-charge routine; and
  initiate, subsequent to the configuration of the session for the bidirectional power delivery, a discharge of the electric vehicle.

10. The electric vehicle of claim 1, comprising the one or more processors to:
  provide, subsequent to the configuration of the session for the bidirectional power delivery, a target current value to the charger that is less than zero;
  cause, responsive to provision of the target current value, an initiation of a discharge of the electric vehicle;
  receive, subsequent to the initiation of the discharge of the electric vehicle, an indication of a maximum current value from the charger that is greater than zero; and
  charge, responsive to receipt of the indication of the maximum current value, the electric vehicle in the session.

11. The electric vehicle of claim 1, wherein transmission of the data structure comprising the field with the value that is less than zero is to trigger the configuration of the session for the bidirectional power delivery.

12. A method, comprising:
  executing, by an electric vehicle comprising one or more processors and memory, a communication between a charger and the electric vehicle to establish a session for bidirectional power delivery between the charger and the electric vehicle via a power cable;
  transmitting, by the electric vehicle in the communication and prior to conveyance of power in the session, a data structure comprising a field designated to store a value that is less than zero which indicates that the electric vehicle is configured to discharge power during the bidirectional power delivery; and
  causing, by the electric vehicle subsequent to transmission of the data structure comprising the field with the value that is less than zero and prior to delivery of power in the session to discharge power from the electric vehicle, a configuration of the session for the bidirectional power delivery between the charger and the electric vehicle via the power cable.

13. The method of claim 12, wherein:
  the field is for a minimum current;
  the value is less than zero; and
  a protocol of the communication comprises a vehicle-to-home protocol.

14. The method of claim 12, comprising:

determining, by the electric vehicle, the power cable between the charger and the electric vehicle is secure; and transmitting, by the electric vehicle subsequent to determining that the power cable is secure, a target value for current from the electric vehicle that is less than zero to cause the charger to initiate a discharge of the electric vehicle.

15. The method of claim 12, comprising:

receiving, by the electric vehicle subsequent to the configuration of the session for the bidirectional power delivery, an indication that a maximum current for the session is less than zero; and discharging, by the electric vehicle subsequent to receipt of the indication that the maximum current is less than zero, the electric vehicle.

16. The method of claim 12, comprising:

receiving, by the electric vehicle subsequent to the configuration of the session for the bidirectional power delivery, an indication that a maximum current for the charger is less than zero;

providing, by the electric vehicle, subsequent to receipt of the indication that the maximum current is less than zero, to the charger, an indication of a target value for current that is less than zero; and discharging, by the electric vehicle responsive to the indication of the target value, power from the electric vehicle.

17. The method of claim 12, comprising:

causing, by the electric vehicle, execution of a first state of the communication subsequent to detection that the charger is plugged into the electric vehicle, the first state comprising:

determination that a type of protocol of the charger matches the type of protocol of the electric vehicle; and the configuration of the session for bidirectional charging.

18. The method of claim 12, comprising:

causing, by the electric vehicle, execution of a first state of the communication subsequent to detection that the charger is plugged into the electric vehicle, the first state comprising determination that a type of protocol of the charger matches the type of protocol of the electric vehicle;

causing, by the electric vehicle, execution of a second state of the communication subsequent to the configuration of the session for the bidirectional power delivery, the second state comprising a pre-charge routine; and initiating, by the electric vehicle subsequent to the configuration of the session for the bidirectional power delivery, a discharge of the electric vehicle.

19. The method of claim 12, comprising:

providing, by the electric vehicle, subsequent to the configuration of the session for the bidirectional power delivery, a target current value to the charger that is less than zero;

causing, by the electric vehicle responsive to provision of the target current value that is less than zero, an initiation of a discharge of the electric vehicle;

receiving, by the electric vehicle, subsequent to the initiation of the discharge of the electric vehicle, an indication of a maximum current value from the charger that is greater than zero; and charging, by the electric vehicle, responsive to receipt of the indication of the maximum current value, the electric vehicle in the session.

20. A system, comprising:

a memory and one or more processors to:

execute a communication between a charger and an electric vehicle to establish a session for bidirectional power delivery between the charger and the electric vehicle via a power cable;

transmit, in the communication and prior to conveyance of power in the session, a data structure comprising a field designated to store a value that is less than zero which indicates that the electric vehicle is configured to discharge power during the bidirectional power delivery; and cause, subsequent to transmission of the data structure comprising the field with the value that is less than zero and prior to delivery of power in the session to discharge power from the electric vehicle, a configuration of the session for the bidirectional power delivery between the charger and the electric vehicle via the power cable.

21. The system of claim 20, comprising the one or more processors to:

receive, subsequent to configuration of the session for bidirectional power delivery, an indication that a maximum current for the session is less than zero; and discharge, subsequent to receipt of the indication that the maximum current is less than zero, the electric vehicle.

* * * * *